(12) United States Patent
Li et al.

(10) Patent No.: US 11,330,598 B2
(45) Date of Patent: May 10, 2022

(54) TRANSMISSION RESOURCE CONFIGURATION METHOD, APPARATUS, AND SYSTEM

(71) Applicant: Huawei Technologies Co., Ltd., Shenzhen (CN)

(72) Inventors: Mingchao Li, Beijing (CN); Zhenshan Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 89 days.

(21) Appl. No.: 16/664,371

(22) Filed: Oct. 25, 2019

(65) Prior Publication Data
US 2020/0059936 A1 Feb. 20, 2020

Related U.S. Application Data

(63) Continuation of application No. PCT/CN2017/083109, filed on May 4, 2017.

(51) Int. Cl.
*H04W 72/04* (2009.01)
*H04W 72/02* (2009.01)
*H04W 92/18* (2009.01)

(52) U.S. Cl.
CPC ....... *H04W 72/0493* (2013.01); *H04W 72/02* (2013.01); *H04W 72/042* (2013.01); *H04W 72/044* (2013.01); *H04W 92/18* (2013.01)

(58) Field of Classification Search
CPC ............. H04W 72/0493; H04W 72/02; H04W 72/042; H04W 72/044; H04W 92/18;
(Continued)

(56) References Cited

U.S. PATENT DOCUMENTS 9,848,454 B2 * 12/2017 Patil ...................... H04W 72/02
10,440,581 B2 * 10/2019 Belleschi .............. H04W 16/10
(Continued)

FOREIGN PATENT DOCUMENTS

CN 106233807 A 12/2016
CN 106464715 A 2/2017
(Continued)

OTHER PUBLICATIONS

Huawei, et al., "Resource pool design and multiplexing of SA and its associated data", 3GPP TSG RAN WG1 Meeting #85, R1-164056, Nanjing, China, May 23-27, 2016, 7 pages.

*Primary Examiner* — Hanh N Nguyen
(74) *Attorney, Agent, or Firm* — Slater Matsil, LLP

(57) ABSTRACT

A method includes: receiving, by a terminal, at least one piece of first transmission resource pool configuration information sent by a network device, where the first transmission resource pool configuration information includes at least a first transmission resource pool identifier and first transmission resource pool resource configuration information; when the terminal determines that a first transmission resource pool corresponding to the first transmission resource pool identifier is in a first state, independently selecting, by the terminal, a direct link transmission resource from time-frequency transmission resources corresponding to the first transmission resource pool resource configuration information; and sending, by the terminal, direct link service data by using the direct link transmission resource.

17 Claims, 10 Drawing Sheets

(58) Field of Classification Search
CPC ..... H04W 76/27; H04W 76/14; H04W 72/04; H04W 72/14; H04W 72/1289; H04L 5/0033; H04L 5/0037; H04L 5/0007; H04L 5/0094
See application file for complete search history.

(56) References Cited

U.S. PATENT DOCUMENTS

| | | | |
|---|---|---|---|
| 10,499,424 B2 * | 12/2019 | Tiirola | ............... H04W 72/1289 |
| 10,575,291 B2 * | 2/2020 | Nord | ................... H04W 72/042 |
| 2016/0219620 A1 * | 7/2016 | Lee | ...................... H04W 76/14 |
| 2016/0295624 A1 | 10/2016 | Novlan et al. | |
| 2016/0338094 A1 | 11/2016 | Faurie et al. | |
| 2017/0041902 A1 | 2/2017 | Sheng | |
| 2017/0064534 A1 | 3/2017 | Loehr et al. | |
| 2018/0213438 A1 | 7/2018 | Muraoka et al. | |

FOREIGN PATENT DOCUMENTS

| | | |
|---|---|---|
| CN | 106559446 A | 4/2017 |
| KR | 20160040389 A | 4/2016 |
| WO | 2016045094 A1 | 3/2016 |
| WO | 2016197396 A1 | 12/2016 |
| WO | 2017010030 A1 | 1/2017 |

\* cited by examiner

TRANSMISSION RESOURCE CONFIGURATION METHOD, APPARATUS, AND SYSTEM

CROSS-REFERENCE TO RELATED APPLICATIONS

This application is a continuation of International Application No. PCT/CN2017/083109, filed on May 4, 2017, the disclosure of which is hereby incorporated by reference in its entirety.

TECHNICAL FIELD

Embodiments of the present invention relate to the field of communications technologies, and in particular, to a transmission resource configuration method, an apparatus, and a system

BACKGROUND

In a communications system, when data is transmitted between user equipment (UE), UE may directly send data to another UE by using a transmission resource pool configured by a base station for the UE.

Generally, the UE may transmit data in a centralized transmission mode or a distributed transmission mode. For example, in the centralized transmission mode, when the UE is to send data, the UE may request a transmission resource pool from a network device, and send data by using transmission resources in the requested transmission resource pool. In the distributed transmission mode, the UE may obtain, in advance, transmission resource pool configuration information sent by the network device, and when the UE sends data, the UE may independently select a transmission resource pool in the configuration information and transmit data by using transmission resources in the transmission resource pool.

However, in the foregoing methods, a transmission resource pool used for the centralized transmission mode (referred to as a centralized transmission resource pool below) and a transmission resource pool used for the distributed transmission mode (referred to as a distributed transmission resource pool below) are orthogonal. To be specific, the centralized transmission resource pool cannot be used for distributed transmission, and the distributed transmission resource pool cannot be used for centralized transmission. Therefore, load of the centralized transmission resource pool and load of the distributed transmission resource pool may be unbalanced. This may result in relatively low transmission resource utilization.

SUMMARY

This application provides a transmission resource configuration method, an apparatus, and a system, to improve transmission resource utilization.

To achieve the foregoing objective, the following technical solutions are used in this application:

According to a first aspect, this application provides a transmission resource configuration method, and the method may include: receiving, by a terminal, at least one piece of first transmission resource pool configuration information sent by a network device, where the first transmission resource pool configuration information includes at least a first transmission resource pool identifier and first transmission resource pool resource configuration information; when the terminal determines that a first transmission resource pool corresponding to the first transmission resource pool identifier is in a first state, independently selecting, by the terminal, a direct link transmission resource from time-frequency transmission resources corresponding to the first transmission resource pool resource configuration information; and sending, by the terminal, direct link service data by using the direct link transmission resource selected by the terminal.

According to the transmission resource configuration method provided in this application, the terminal can determine a state of the first transmission resource pool corresponding to the first transmission resource pool identifier in the at least one piece of first transmission resource pool configuration information received by the terminal. Therefore, the terminal can use the first transmission resource pool in the first state as a distributed transmission resource pool of the terminal, and send the direct link service data in a distributed transmission mode, thereby improving transmission resource utilization.

In a first optional implementation of the first aspect, the method in which the terminal determines that the first transmission resource pool corresponding to the first transmission resource pool identifier is in the first state may include: receiving, by the terminal, first state indication information sent by the network device; and determining, by the terminal based on the first state indication information, that the first transmission resource pool is in the first state, where the first state indication information includes any one of first indication information, second indication information, and third indication information, the first indication information includes a second transmission resource pool identifier, the second indication information includes at least an indicator used to indicate a state of the first transmission resource pool, and the third indication information includes a first state activation instruction.

In this application, the terminal may determine, under an indication of the first state indication information sent by the network device, that the first transmission resource pool is in the first state, and the first state indication information is diverse. In this way, the terminal can determine, by using a plurality of pieces of indication information, that the first transmission resource pool is in the first state.

In a second optional implementation of the first aspect, the method in which the terminal determines, based on the first state indication information, that the first transmission resource pool is in the first state may include: if the first state indication information includes the first indication information, when the second transmission resource pool identifier is the first transmission resource pool identifier, determining, by the terminal, that the first transmission resource pool is in the first state; if the first state indication information includes the second indication information, when the indicator is a first indicator, determining, by the terminal based on the first indicator, that the first transmission resource pool is in the first state, where the first indicator is used to indicate that a state of the first transmission resource pool is the first state; or if the first state indication information includes the third indication information, when the terminal receives the third indication information, determining, by the terminal, that the first transmission resource pool is in the first state.

In this application, the terminal may determine, in a plurality of manners, that the first transmission resource pool is in the first state, so that the terminal can independently select the direct link transmission resource from the time-frequency transmission resources corresponding to the first transmission resource pool resource configuration information, and send the direct link service data by using the direct link transmission resource selected by the terminal.

In a third optional implementation of the first aspect, the first transmission resource pool configuration information may further include a first threshold, and the first threshold includes at least one of a first load threshold, a first signal quality threshold, and a first priority threshold. The method in which the terminal determines that the first transmission resource pool corresponding to the first transmission resource pool identifier is in the first state may include: determining, by the terminal based on a first preset condition, that the first transmission resource pool is in the first state, where the first preset condition includes that load of a second transmission resource pool is greater than or equal to the first load threshold, and/or signal quality of the network device is less than or equal to the first signal quality threshold, and/or a priority of data to be transmitted by the terminal is higher than or equal to the first priority threshold, and the second transmission resource pool is a transmission resource pool that is currently used by the terminal to send the direct link service data.

In this application, the terminal may determine, based on the first threshold in the first transmission resource pool configuration information received by the terminal and with reference to an actual status of a network (for example, the load of the second transmission resource pool, the signal quality of the network device, and the priority of the data to be transmitted by the terminal), that the first transmission resource pool is in the first state, in other words, the terminal may independently determine that the first transmission resource pool is in the first state, so that the terminal can independently select the direct link transmission resource from the time-frequency transmission resources corresponding to the first transmission resource pool resource configuration information, and send the direct link service data by using the direct link transmission resource selected by the terminal.

In a fourth optional implementation of the first aspect, after the receiving, by a terminal, at least one piece of first transmission resource pool configuration information sent by a network device, the transmission resource configuration method provided in this application may further include: when the terminal determines that the first transmission resource pool corresponding to the first transmission resource pool identifier is in a second state, stopping, by the terminal, independently selecting a time-frequency transmission resource from the time-frequency transmission resources corresponding to the transmission resource pool resource configuration information.

In this application, the terminal may determine that the first transmission resource pool is in the first state (in other words, the first transmission resource pool may be used as a distributed transmission resource pool for the terminal to transmit data), or the terminal may determine that the first transmission resource pool is in the second state (in other words, the first transmission resource pool cannot be used by the terminal to transmit data, and the first transmission resource pool may be used as a centralized transmission resource pool for another terminal to transmit data). This may be understood as: the first transmission resource pool may be used as a distributed transmission resource pool or a centralized transmission resource pool. In this way, utilization of the first transmission resource pool can be improved.

In a fifth optional implementation of the first aspect, the method in which the terminal determines that the first transmission resource pool corresponding to the first transmission resource pool identifier is in the second state may include: receiving, by the terminal, second state indication information sent by the network device; and determining, by the terminal based on the second state indication information, that the first transmission resource pool is in the second state, where the second state indication information includes any one of fourth indication information, fifth indication information, and sixth indication information, the fourth indication information includes a third transmission resource pool identifier, the fifth indication information includes at least an indicator used to indicate a state of the first transmission resource pool, and the third indication information includes a second state activation instruction.

In this application, the terminal may determine, under an indication of the second state indication information sent by the network device, that the first transmission resource pool is in the second state, and the second state indication information is diverse. In this way, the terminal can indicate, by using a plurality of pieces of indication information, that the first transmission resource pool is in the second state.

In a sixth optional implementation of the first aspect, the method in which the terminal determines, based on the second state indication information, that the first transmission resource pool is in the second state may include: if the second state indication information includes the fourth indication information, when the third transmission resource pool identifier is the first transmission resource pool identifier, determining, by the terminal, that the first transmission resource pool is in the second state; if the second state indication information includes the fifth indication information, when the indicator in the fifth indication information is a second indicator, determining, by the terminal based on the second indicator, that the first transmission resource pool is in the second state, where the second indicator is used to indicate that a state of the first transmission resource pool is the second state; or if the second state indication information includes the sixth indication information, when the terminal receives the sixth indication information, determining, by the terminal, that the first transmission resource pool is in the second state.

In this application, the terminal may determine, in a plurality of manners, that the first transmission resource pool is in the second state, so that the terminal stops independently selecting a time-frequency transmission resource from the time-frequency transmission resources corresponding to the first transmission resource pool resource configuration information. In this way, the first transmission resource pool can be used by another terminal to transmit data, thereby improving transmission resource utilization.

In a seventh optional implementation of the first aspect, the first transmission resource pool configuration information may further include a second threshold, and the second threshold includes at least one of a second load threshold, a second signal quality threshold, and a second priority threshold. The method in which the terminal determines that the first transmission resource pool corresponding to the first transmission resource pool identifier is in the second state may include: determining, by the terminal based on a second preset condition, that the first transmission resource pool is in the second state, where the second preset condition includes that load of the first transmission resource pool is less than the second load threshold, and/or the signal quality of the network device is greater than the second signal quality threshold, and/or the priority of the data to be transmitted by the terminal is lower than the second priority threshold.

In this application, the terminal may determine, based on the second threshold in the first transmission resource pool configuration information received by the terminal and with reference to an actual status of the network (for example, the load of the first transmission resource pool, the signal quality of the network device, and the priority of the data to be transmitted by the terminal), that the first transmission resource pool is in the second state, in other words, the terminal may independently determine that the first transmission resource pool is in the second state, so that the terminal stops independently selecting the time-frequency transmission resource from the time-frequency transmission resources corresponding to the first transmission resource pool resource configuration information. In this way, the first transmission resource pool can be used by another terminal to transmit data, thereby improving transmission resource utilization.

In an eighth optional implementation of the first aspect, the first transmission resource pool configuration information may further include at least one of a first area identifier, a first service type identifier, and a first bearer identifier. When the first transmission resource pool configuration information includes at least one of the first area identifier, the first service type identifier, and the first bearer identifier, the transmission resource configuration method provided in this application may further include: when a second area identifier corresponding to an area in which the terminal is located is the first area identifier, and/or when a second service type identifier of data to be sent by the terminal is the first service type identifier, and/or when a second bearer identifier of the data to be sent by the terminal is the first bearer identifier, independently selecting, by the terminal, the direct link transmission resource from the time-frequency transmission resources corresponding to the first transmission resource pool resource configuration information, where the first area identifier is used to indicate an available area of the first transmission resource pool, the first service type identifier is used to indicate a service type supported by the first transmission resource pool for transmission, and the first bearer identifier is used to indicate a bearer type supported by the first transmission resource pool.

In this application, after the terminal determines that the first transmission resource pool is in the first state, the terminal may determine, based on at least one of the first area identifier, the first service type identifier, and the first bearer identifier in the first transmission resource pool configuration information, that the first transmission resource pool can be used by the terminal to send the direct link service data, in other words, the terminal may independently select the direct link transmission resource from the time-frequency transmission resources corresponding to the first transmission resource pool resource configuration information, and send the direct link service data by using the direct link transmission resource.

According to a second aspect, this application provides a transmission resource configuration method, and the method may include: sending, by a network device, at least one piece of first transmission resource pool configuration information to a terminal, where the first transmission resource pool configuration information includes at least a first transmission resource pool identifier and first transmission resource pool resource configuration information; and sending, by the network device, first state indication information to the terminal, where the first state indication information includes any one of first indication information, second indication information, and third indication information, the first indication information includes a second transmission resource pool identifier, the second indication information includes at least an indicator used to indicate a state of a first transmission resource pool, and the third indication information includes a first state activation instruction.

According to the transmission resource configuration method provided in this application, the network device may send the at least one piece of transmission resource pool configuration information to the terminal, and then the network device may send the first state indication information to the terminal, so that the terminal determines, based on the first state indication information, that the first transmission resource pool is in a first state. Therefore, the terminal can independently select a direct link transmission resource from time-frequency transmission resources corresponding to the first transmission resource pool resource configuration information, and send direct link service data by using the direct link transmission resource, thereby improving transmission resource utilization.

In a first optional implementation of the second aspect, after the sending, by a network device, at least one piece of first transmission resource pool configuration information to a terminal, the transmission resource configuration method provided in this application may further include: sending, by the network device, second state indication information to the terminal, where the second state indication information includes any one of fourth indication information, fifth indication information, and sixth indication information, the fourth indication information includes a third transmission resource pool identifier, the fifth indication information includes at least an indicator used to indicate a state of the first transmission resource pool, and the third indication information includes a second state activation instruction.

In this application, the first state indication information sent by the network device to the terminal is diverse. In this way, the terminal can determine, by using a plurality of pieces of indication information, that the first transmission resource pool is in the first state.

According to a third aspect, this application provides a terminal, and the terminal may include a receiving module, a selection module, and a sending module. The receiving module may be configured to receive at least one piece of first transmission resource pool configuration information sent by a network device, where the first transmission resource pool configuration information includes at least a first transmission resource pool identifier and first transmission resource pool resource configuration information. The selection module may be configured to: when the terminal determines that a first transmission resource pool corresponding to the first transmission resource pool identifier is in a first state, independently select a direct link transmission resource from time-frequency transmission resources corresponding to the first transmission resource pool resource configuration information. The sending module may be configured to send direct link service data by using the direct link transmission resource selected by the selection module.

In a first optional implementation of the third aspect, the terminal provided in this application may further include a determining module. The receiving module may be further configured to receive first state indication information sent by the network device, and the determining module is configured to determine, based on the first state indication information received by the receiving module, that the first transmission resource pool is in the first state, where the first state indication information includes any one of first indication information, second indication information, and third indication information, the first indication information includes a second transmission resource pool identifier, the second indication information includes at least an indicator used to indicate a state of the first transmission resource pool, and the third indication information includes a first state activation instruction.

In a second optional implementation of the third aspect, the determining module is specifically configured to: if the first state indication information includes the first indication information, when the second transmission resource pool identifier is the first transmission resource pool identifier, determine that the first transmission resource pool is in the first state; if the first state indication information includes the second indication information, when the indicator is a first indicator, determine, based on the first indicator, that the first transmission resource pool is in the first state, where the first indicator is used to indicate that a state of the first transmission resource pool is the first state; or if the first state indication information includes the third indication information, when the terminal receives the third indication information, determine that the first transmission resource pool is in the first state.

In a third optional implementation of the third aspect, the first transmission resource pool configuration information may further include a first threshold, and the first threshold includes at least one of a first load threshold, a first signal quality threshold, and a first priority threshold. The determining module is configured to determine, based on a first preset condition, that the first transmission resource pool is in the first state, where the first preset condition includes that load of a second transmission resource pool is greater than or equal to the first load threshold, and/or signal quality of the network device is less than or equal to the first signal quality threshold, and/or a priority of data to be transmitted by the terminal is higher than or equal to the first priority threshold, and the second transmission resource pool is a transmission resource pool that is currently used by the terminal to send the direct link service data.

In a fourth optional implementation of the third aspect, the selection module is further configured to: when the terminal determines that the first transmission resource pool corresponding to the first transmission resource pool identifier is in a second state, stop independently selecting a time-frequency transmission resource from the time-frequency transmission resources corresponding to the first transmission resource pool resource configuration information.

In a fifth optional implementation of the third aspect, the receiving module is further configured to receive second state indication information sent by the network device, and the determining module is further configured to determine, based on the second state indication information, that the first transmission resource pool is in the second state, where the second state indication information includes any one of fourth indication information, fifth indication information, and sixth indication information, the fourth indication information includes a third transmission resource pool identifier, the fifth indication information includes at least an indicator used to indicate a state of the first transmission resource pool, and the third indication information includes a second state activation instruction.

In a sixth optional implementation of the third aspect, the determining module is specifically configured to: if the second state indication information includes the fourth indication information, when the third transmission resource pool identifier is the first transmission resource pool identifier, determine that the first transmission resource pool is in the second state; if the second state indication information includes the fifth indication information, when the indicator in the fifth indication information is a second indicator, determine, based on the second indicator, that the first transmission resource pool is in the second state, where the second indicator is used to indicate that a state of the first transmission resource pool is the second state; or if the second state indication information includes the sixth indication information, when the terminal receives the sixth indication information, determine that the first transmission resource pool is in the second state.

In a seventh optional implementation of the third aspect, the first transmission resource pool configuration information may further include a second threshold, and the second threshold includes at least one of a second load threshold, a second signal quality threshold, and a second priority threshold. The determining module is specifically configured to determine, based on a second preset condition, that the first transmission resource pool is in the second state, where the second preset condition includes that load of the first transmission resource pool is less than the second load threshold, and/or the signal quality of the network device is greater than the second signal quality threshold, and/or the priority of the data to be transmitted by the terminal is lower than the second priority threshold.

In an eighth optional implementation of the third aspect, the first transmission resource pool configuration information may further include at least one of a first area identifier, a first service type identifier, and a first bearer identifier. The selection module is further configured to: when a second area identifier corresponding to an area in which the terminal is located is the first area identifier, and/or when a second service type identifier of data to be sent by the terminal is the first service type identifier, and/or when a second bearer identifier of the data to be sent by the terminal is the first bearer identifier, independently select the direct link transmission resource from the time-frequency transmission resources corresponding to the first transmission resource pool resource configuration information, where the first area identifier is used to indicate an available area of the first transmission resource pool, the first service type identifier is used to indicate a service type supported by the first transmission resource pool for transmission, and the first bearer identifier is used to indicate a bearer type supported by the first transmission resource pool.

For technical effects of the third aspect and the optional implementations of the third aspect, refer to the related descriptions of the technical effects of the first aspect and the optional implementations of the first aspect. Details are not described herein again.

According to a fourth aspect, this application provides a network device, and the network device may include: a sending module. The sending module is configured to send at least one piece of first transmission resource pool configuration information to a terminal, and send first state indication information to the terminal, where the first transmission resource pool configuration information includes at least a first transmission resource pool identifier and first transmission resource pool resource configuration information, the first state indication information includes any one of first indication information, second indication information, and third indication information, the first indication information includes a second transmission resource pool identifier, the second indication information includes at least an indicator used to indicate a state of a first transmission resource pool, and the third indication information includes a first state activation instruction.

In a first optional implementation of the fourth aspect, the sending module is further configured to: after the network device sends the at least one piece of first transmission resource pool configuration information to the terminal, send second state indication information to the terminal, where the second state indication information includes any one of fourth indication information, fifth indication information, and sixth indication information, the fourth indication information includes a third transmission resource pool identifier, the fifth indication information includes at least an indicator used to indicate a state of the first transmission resource pool, and the third indication information includes a second state activation instruction.

In the second aspect and the fourth aspect, the first transmission resource pool configuration information further includes a first threshold, and the first threshold includes at least one of a first load threshold, a first signal quality threshold, and a first priority threshold.

In this application, the first transmission resource pool configuration information further includes the first threshold, the first threshold may be used to determine whether the first transmission resource pool is in a first state, so that when the first transmission resource pool is in the first state, the terminal can independently select a time-frequency transmission resource from time-frequency transmission resources corresponding to the first transmission resource pool resource configuration information.

In the second aspect and the fourth aspect, the first transmission resource pool configuration information further includes a second threshold, and the second threshold includes at least one of a second load threshold, a second signal quality threshold, and a second priority threshold.

In this application, the first transmission resource pool configuration information further includes the second threshold, the second threshold may be used to determine whether the first transmission resource pool is in a second state, so that when the first transmission resource pool is in the second state, the terminal stops independently selecting a time-frequency transmission resource from the time-frequency transmission resources corresponding to the first transmission resource pool resource configuration information.

In the second aspect and the fourth aspect, the first transmission resource pool configuration information may further include at least one of a first area identifier, a first service type identifier, and a first bearer identifier, where the first area identifier is used to indicate an available area of the first transmission resource pool, the first service type identifier is used to indicate a service type supported by the first transmission resource pool for transmission, and the first bearer identifier is used to indicate a bearer type supported by the first transmission resource pool.

In this application, the first transmission resource pool configuration information sent by the network device may further include at least one of the first area identifier, the first service type identifier, and the first bearer identifier. In this way, the terminal can determine, based on at least one of the first area identifier, the first service type identifier, and the first bearer identifier in the first transmission resource pool configuration information, that the first transmission resource pool can be used by the terminal to send direct link service data, in other words, the terminal may independently select a direct link transmission resource from the time-frequency transmission resources corresponding to the first transmission resource pool resource configuration information, and send the direct link service data by using the direct link transmission resource.

For technical effects of the fourth aspect and the optional implementations of the fourth aspect, refer to the related descriptions of the technical effects of the second aspect and the optional implementations of the second aspect. Details are not described herein again.

According to a fifth aspect, this application provides a terminal, and the terminal may include a processor and a memory coupled to the processor. The memory may be configured to store a computer instruction. When the terminal runs, the processor executes the computer instruction stored in the memory, so that the terminal performs the transmission resource configuration method in any one of the first aspect and the optional implementations of the first aspect.

According to a sixth aspect, this application provides a computer readable storage medium, and the computer readable storage medium may include a computer instruction. When the computer instruction runs on a terminal, the terminal performs the transmission resource configuration method in any one of the first aspect and the optional implementations of the first aspect.

According to a seventh aspect, this application provides a computer program product including a computer instruction, so that when the computer program product runs on a terminal, the terminal performs the transmission resource configuration method in any one of the first aspect and the optional implementations of the first aspect.

For descriptions of related content and technical effects of the fifth aspect to the seventh aspect, refer to the related descriptions of the related content and technical effects of the first aspect and the optional implementations of the first aspect. Details are not described herein again.

According to an eighth aspect, this application provides a network device, and the network device may include a processor and a memory coupled to the processor. The memory may be configured to store a computer instruction. When the network device runs, the processor executes the computer instruction stored in the memory, so that the network device performs the transmission resource configuration method in any one of the second aspect and the optional implementations of the second aspect.

According to a ninth aspect, this application provides a computer readable storage medium, and the computer readable storage medium may include a computer instruction. When the computer instruction runs on a terminal, the network device performs the transmission resource configuration method in any one of the second aspect and the optional implementations of the second aspect.

According to a tenth aspect, this application provides a computer program product including a computer instruction, so that when the computer program product runs on a network device, the network device performs the transmission resource configuration method in any one of the second aspect and the optional implementations of the second aspect.

For descriptions of related content and technical effects of the eighth aspect to the tenth aspect, refer to the related descriptions of the related content and technical effects of the second aspect and the optional implementations of the second aspect. Details are not described herein again.

According to an eleventh aspect, this application provides a communications system, and the communications system may include the terminal in any one of the third aspect and the optional implementations of the third aspect, and the network device in any one of the fourth aspect and the optional implementations of the fourth aspect.

Alternatively, the communications system may include the terminal in the fifth aspect and the network device in the eighth aspect.

For technical effects of the eleventh aspect, refer to related descriptions of technical effects of the third aspect and the optional implementations of the third aspect, the fourth aspect and the optional implementations of the fourth aspect, the fifth aspect, and the eighth aspect. Details are not described herein again.

DETAILED DESCRIPTION OF ILLUSTRATIVE EMBODIMENTS

Figure 1:
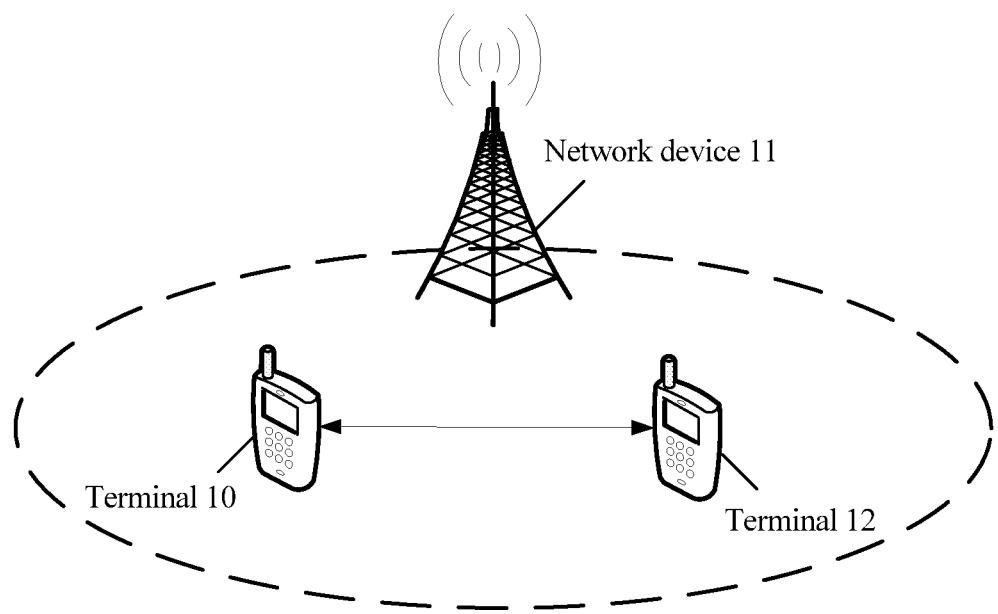
FIG. 1 is a schematic architectural diagram of a communications system according to an embodiment of the present invention.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of the present invention, the terms "first", "second", and the like are intended to distinguish between different objects but do not describe a particular order of the objects. For example, first state indication information and second state indication information are intended to distinguish between different state indication information, but do not describe a particular order of the state indication information.

In addition, in the embodiments of the present invention, the word "example" or "for example" is used to represent giving an example, an illustration, or a description. Any embodiment or design scheme described as "example" or "for example" in the embodiments of the present invention should not be explained as being more preferred or having more advantages than another embodiment or design scheme. Exactly, use of the word "example" or "example" or the like is intended to present a related concept in a specific manner.

In the descriptions in the embodiments of the present invention, unless otherwise provided, "a plurality of" means two or more than two. For example, a plurality of transmission resource pools means two or more than two transmission resource pools.

The following explains some concepts in a transmission resource configuration method, an apparatus, and a system that are provided in the embodiments of the present invention.

In the embodiments of the present invention, a terminal transmits data in a centralized transmission mode or a distributed transmission mode by using a transmission resource pool.

Centralized transmission mode: when the terminal needs to send data, the terminal requests a transmission resource from a network device, and after the network device allocates transmission resources in a transmission resource pool to the terminal, the terminal may send data by using the transmission resources in the transmission resource pool.

Distributed transmission mode: the terminal may obtain, in advance, transmission resource pool configuration information sent by the network device, and when the terminal needs to send data, the terminal may independently select a transmission resource pool in the transmission resource pool configuration information obtained in advance, and transmit data by using transmission resources in the transmission resource pool.

Centralized transmission resource pool: a transmission resource pool used for the centralized transmission mode is referred to as a centralized transmission resource pool.

Distributed transmission resource pool: a transmission resource pool used for the distributed transmission mode is referred to as a distributed transmission resource pool.

Generally, states of a transmission resource pool include a first state and a second state.

The first state is a state in which a transmission resource pool may be used as a distributed transmission resource pool, to be specific, the terminal may send data in the distributed transmission mode by using the transmission resource pool.

The second state is a state in which a transmission resource pool may be used as a centralized transmission resource pool, to be specific, the terminal may send data in the centralized transmission mode by using the transmission resource pool.

Generally, in a communications system, the terminal (for example, UE) may send data to another device in the centralized transmission mode or the distributed transmission mode by using a transmission resource pool configured by a base station for the UE. However, a transmission resource pool used for the centralized transmission mode and a transmission resource used for the distributed transmission mode are orthogonal. This may result in relatively low transmission resource utilization.

To resolve the problem, the embodiments of the present invention provide a transmission resource configuration method. The terminal may receive at least one piece of first transmission resource pool configuration information sent by the network device, where the first transmission resource pool configuration information includes a first transmission resource pool identifier and first transmission resource pool resource configuration information. In addition, when the terminal determines that a first transmission resource pool corresponding to the first transmission resource pool identifier is in the first state, the terminal may independently select a direct link transmission resource from time-frequency transmission resources corresponding to the first transmission resource pool resource configuration information, and the terminal sends direct link service data by using the direct link transmission resource in the first transmission resource pool (to be specific, the terminal may use the first transmission resource pool as a distributed transmission resource pool, and send the direct link service data in the distributed transmission mode). This can improve transmission resource utilization.

The transmission resource configuration method provided in the embodiments of the present invention may be applied to the communications system. FIG. 1 is a schematic architectural diagram of a communications system according to an embodiment of the present invention. In FIG. 1, the communications system includes a terminal 10, a network device 11, and a terminal 12. The terminal 10 and the terminal 12 can directly communicate with each other (namely, direct communication). Specifically, the terminal 10 sends direct link service data to the terminal 12 by using time-frequency transmission resources in a transmission resource pool configured by the network device 11. Similarly, the terminal 12 may also send direct link service data to the terminal 10 by using time-frequency transmission resources in a transmission resource pool configured by the network device 11.

Optionally, in the embodiments of the present invention, the communications system may be a wireless communications system such as an intelligent transportation system (ITS) based on a long term evolution (long term evolution, LTE) technology. In the ITS, when direct link service data is transmitted in vehicle-to-X (V2X) communication, where X represents any object. For example, when direct link service data is transmitted in communication of vehicle to vehicle (V2V), vehicle to infrastructure (V2I), and vehicle to people (V2P), a transmission resource pool may be configured for a vehicle or another object by using the transmission resource configuration method provided in the embodiments of the present invention, and the direct link service data is sent by using time-frequency transmission resources in the transmission resource pool.

Figure 2:
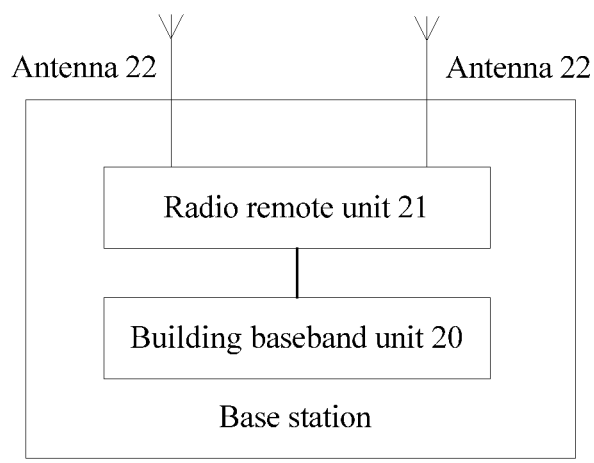
FIG. 2 is a schematic hardware diagram of a base station according to an embodiment of the present invention.

The network device provided in the embodiments of the present invention may be a base station (for example, may be a common base station or an evolved NodeB (evolved node base station, eNB)), or may an access point (AP) or another device with an access function. For example, in the embodiments of the present invention, the common base station is used as an example to describe a hardware structure of the base station. The following describes components of the base station provided in the embodiments of the present invention in detail with reference to FIG. 2. As shown in FIG. 2, the base station provided in the embodiments of the present invention may include a building baseband unit (BBU) 20, a radio remote unit (RRU) 21, and an antenna 22. The BBU 20 and the RRU 21 may be connected via an optical fiber, and the RRU 21 is further connected to the antenna 22 via a coaxial cable and a power splitter (or a coupler). Generally, one BBU 20 may be connected to a plurality of RRUs 21.

The BBU 20 may be configured to implement a baseband processing function (for example, encoding, multiplexing, modulation, and spreading) of a Uu interface (to be specific, an interface between the base station and a terminal); an interface function, signaling processing, and local and remote operation and maintenance functions of a logical interface between a radio network controller (RNC) and the base station; an operating status monitoring function and an alarm information reporting function of a base station system; and the like.

The RRU 21 may include four modules: a digital intermediate frequency module, a transceiver module, a power amplifier module, and a filter module. The digital intermediate frequency module is configured to implement modulation and demodulation, digital up- and down-frequency conversion, digital-to-analog conversion, and the like during optical transmission. The transceiver module is configured to convert an intermediate frequency signal to a radio frequency signal. The power amplifier module is configured to amplify the radio frequency signal. The filter module is configured to complete filtering of the amplified radio frequency signal, and transmit the filtered radio frequency signal through an antenna.

The terminal provided in the embodiments of the present invention may be a mobile phone, a tablet computer, a notebook computer, an ultra-mobile personal computer (UMPC), a netbook, a personal digital assistant (PDA), or the like.

Figure 3:
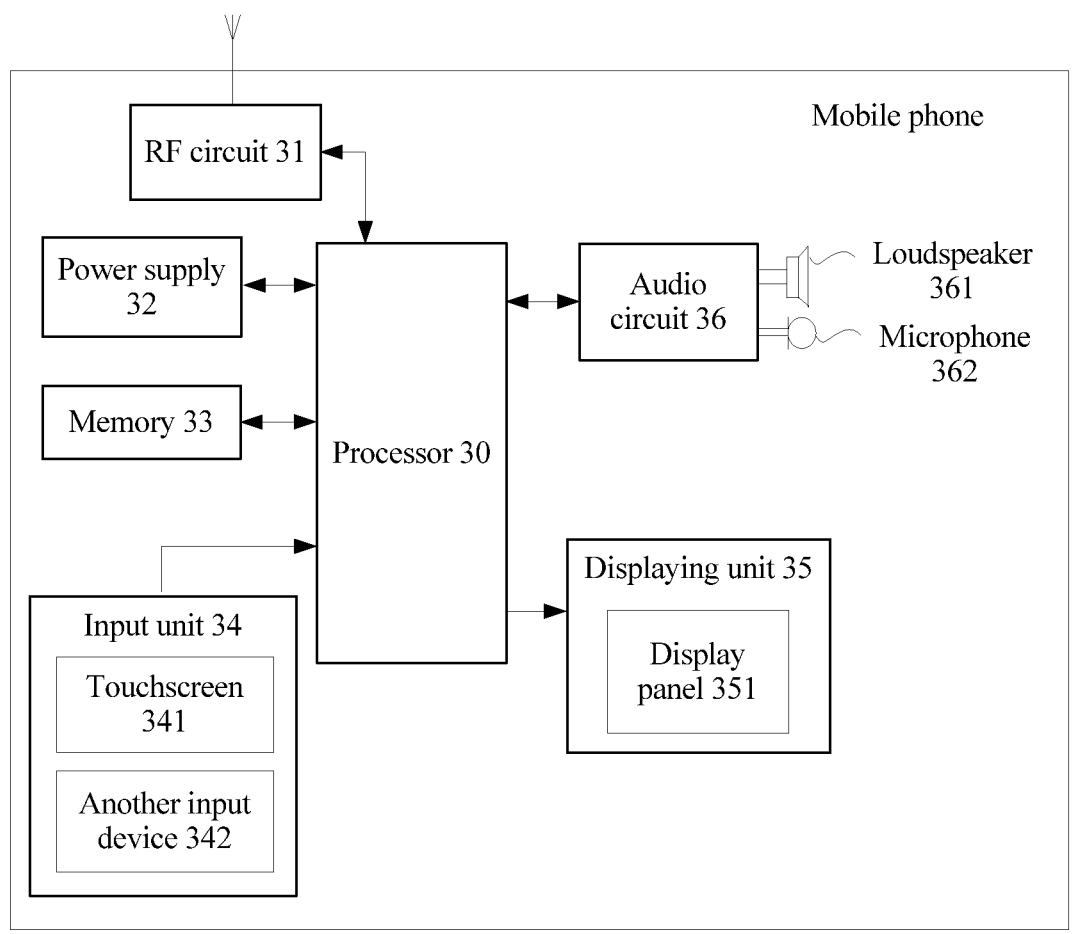
FIG. 3 is a schematic hardware diagram of a mobile phone according to an embodiment of the present invention.

For example, in the embodiments of the present invention, an example in which the terminal is a mobile phone is used to describe a hardware structure of the terminal. The following describes components of the mobile phone provided in the embodiments of the present invention in detail with reference to FIG. 3. As shown in FIG. 3, the mobile phone provided in the embodiments of the present invention includes components such as a processor 30, a radio frequency (RF) circuit 31, a power supply 32, a memory 33, an input unit 34, a display unit 35, and an audio circuit 36. A person skilled in the art may understand that a structure of the mobile phone shown in FIG. 3 does not constitute any limitation on the mobile phone, and the mobile phone may include more or fewer components than those shown in FIG. 3, or may include a combination of some of the components shown in FIG. 3, or may include components arranged differently from those shown in FIG. 3.

The processor 30 is a control center of the mobile phone, and connects all pails of the entire mobile phone by using various interfaces and lines. The processor 30 performs various functions of the mobile phone and process data by running or executing a software program and/or a module stored in the memory 33 and invoking data stored in the memory 33, to perform overall monitoring on the mobile phone. Optionally, the processor 30 may include one or more processing units. Optionally, an application processor and a modem processor may be integrated into the processor 30, the application processor mainly processes an operating system, a user interface, an application program, and the like, and the modem processor mainly processes wireless communication. It may be understood that the modem processor may be a processor separated from the processor 30.

The RF circuit 31 may be configured to receive and send information, or receive and send a signal in a call process. For example, after receiving downlink information from a base station, the RF circuit 31 sends the downlink information to the processor 30 for processing, and in addition, the RF circuit 31 sends uplink data to the base station. Generally, the RF circuit includes but is not limited to an antenna, at least one amplifier, a transceiver, a coupler, a low noise amplifier (LNA), a duplexer, and the like. In addition, the mobile phone may further implement wireless communication with another device in a network by using the RF circuit 31. The wireless communication may use any communications standard or protocol, including but not limited to the global system for mobile communications (GSM), a general packet radio service (GPRS), code division multiple access (CDMA), wideband code division multiple access (WCDMA), LTE, an email, a short message service (SMS), and the like.

The power supply 32 may be configured to supply power to each component of the mobile phone, and the power supply 32 may be a battery. Optionally, the power supply may be logically connected to the processor 30 by using a power management system, to implement functions such as charging management, discharging management, and power consumption management by using the power management system.

The memory 33 may be configured to store a software program and/or a software module. The processor 30 performs various function applications of the mobile phone and processes data by running the software program and/or the software module stored in the memory 33. The memory 33 may mainly include a program storage area and a data storage area. The program storage area may store an operating system, an application program required by at least one function (such as a sound play function or an image play function), and the like. The data storage area may store data (such as audio data, image data, or an address book) created based on use of the mobile phone. In addition, the memory 33 may include a high-speed random access memory, and may further include a nonvolatile memory, for example, at least one magnetic disk storage component, a flash memory component, or another volatile solid-state storage component.

The input unit 34 may be configured to receive entered digital or character information and generate key signal input that is related to a user setting and function control of the mobile phone. Specifically, the input unit 34 may include a touchscreen 341 and another input device 342. The touchscreen 341, also referred to as a touch panel, may collect a touch operation performed by a user on or near the touchscreen 341 (for example, an operation performed by the user on the touchscreen 341 or near the touchscreen 341 by using any appropriate object such as a finger or a stylus), and drive a corresponding connected apparatus according to a preset program. Optionally, the touchscreen 341 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information into touch coordinates, and sends the touch coordinates to the processor 30. In addition, the touch controller can receive and execute a command sent by the processor 30. In addition, the touchscreen 341 may be implemented in a plurality of types, for example, a resistive type, a capacitive type, an infrared ray type, and a surface acoustic wave type. The another input device 342 may include but is not limited to one or more of a physical keyboard, a function button (such as a volume control button or an on/off button), a trackball, a mouse, a joystick, and the like.

The display unit 35 may be configured to display information entered by the user or information provided for the user, and various menus of the mobile phone. The display unit 35 may include a display panel 351. Optionally, the display panel 351 may be configured in a form of a liquid crystal display (liquid crystal display, LCD), an organic light-emitting diode (organic light-emitting diode, OLED), or the like. Further, the touchscreen 341 may cover the display panel 351. After detecting a touch operation performed on or near the touchscreen 341, the touchscreen 341 sends the touch operation to the processor 30 to determine a type of a touch event, and then the processor 30 provides corresponding visual output on the display panel 351 based on the type of the touch event. Although the touchscreen 341 and the display panel 351 serve as two independent components in FIG. 3 to implement input and output functions of the mobile phone, in some embodiments, the touchscreen 341 and the display panel 351 may be integrated to implement the input and output functions of the mobile phone.

The audio circuit 36, a speaker 361, and a microphone 362 are configured to provide an audio interface between the user and the mobile phone. The audio circuit 36 may transmit an electrical signal converted from received audio data to the loudspeaker 361, and the loudspeaker 361 converts the electrical signal into a sound signal for output. In addition, the microphone 362 converts a collected sound signal into an electrical signal, and the audio circuit 36 receives the electrical signal, converts the electrical signal into audio data, and then outputs the audio data to the RF circuit 31 by using the processor 30, so that the audio data is sent to, for example, another mobile phone, or the audio data is output, by using the processor 30, to the memory 33 for further processing.

Optionally, the mobile phone shown in FIG. 3 may further include various sensors, for example, a gyroscope sensor, a hygrometer sensor, an infrared sensor, and a magnetometer sensor. Details are not described herein.

Optionally, the mobile phone shown in FIG. 3 may further include a Wi-Fi module, a Bluetooth module, and the like. Details are not described herein.

It should be noted that, in the embodiments of the present invention, that a terminal transmits data by using a transmission resource pool below means that the terminal uses the transmission resource pool as a distributed transmission resource pool to transmit data in a distributed transmission mode.

With reference to the communications system, in the embodiments of the present invention, a terminal may determine a transmission resource pool that can be used by the terminal to transmit data (in other words, determine a transmission resource pool that is in a first state), or the terminal may determine a transmission resource pool that cannot be used by the terminal to transmit data (in other words, determine a transmission resource pool that is in a second state). Specifically, the terminal may determine a state of a resource pool by using two different methods (which may be referred to as an explicit method and an implicit method in the embodiments of the present invention). The following separately uses the explicit method and the implicit method as an example to describe the transmission resource configuration method provided in the embodiments of the present invention in detail.

Figure 4:
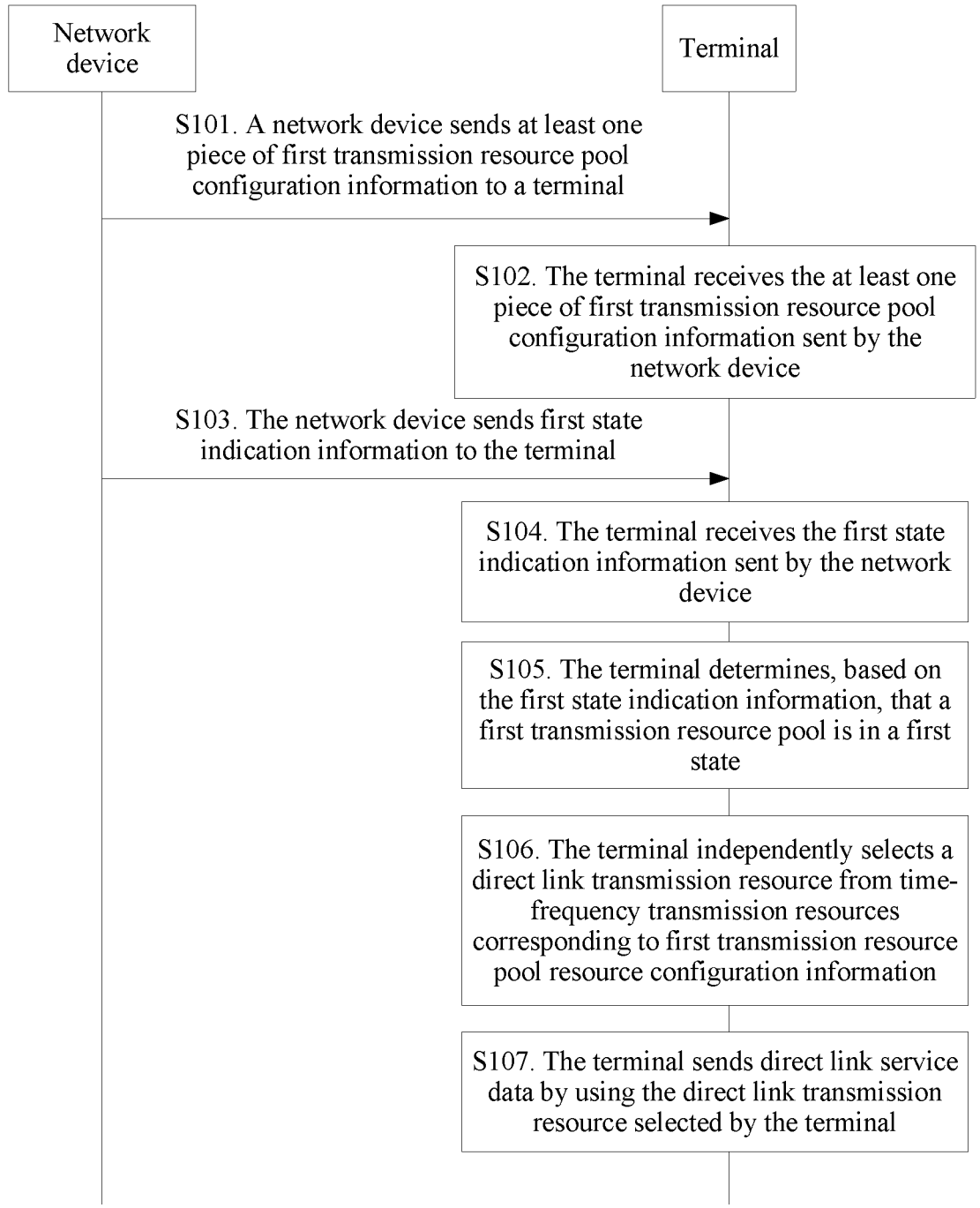
FIG. 4 is a schematic diagram 1 of a transmission resource configuration method according to an embodiment of the present invention.

First, an explicit method is used as an example to describe a transmission resource configuration method provided in an embodiment of the present invention. As shown in FIG. 4, the method may include S101 to S107.

S101. A network device sends at least one piece of first transmission resource pool configuration information to a terminal.

In this embodiment of the present invention, the network device may send the at least one piece of first transmission resource pool configuration information to the terminal. The first transmission resource pool configuration information includes at least a first transmission resource pool identifier and first transmission resource pool resource configuration information. The first transmission resource pool identifier is corresponding to a first transmission resource pool, in other words, the first transmission resource pool identifier may indicate the first transmission resource pool. The first transmission resource pool resource configuration information may indicate a time-frequency transmission resource (namely, a resource block) location in the transmission resource pool.

It should be noted that in this embodiment of the present invention, "first" in the at least one piece of first transmission resource pool configuration information does not specifically limit transmission resource pool configuration information, and "first" is merely used to indicate a name of a transmission resource pool configuration information. The at least one piece of first transmission resource pool configuration information may be understood as at least one transmission resource pool, the first transmission resource pool configuration information may be understood as any one of at least one piece of transmission resource pool configuration information, and the first transmission resource pool may be understood as any one of at least one first transmission resource pool.

Optionally, in this embodiment of the present invention, the first transmission resource pool configuration information may further include at least one of a first area identifier, a first service type identifier, and a first bearer identifier. The first area identifier is used to indicate an available area of the first transmission resource pool, the first service type identifier is used to indicate a service type supported by the first transmission resource pool for transmission, and the first bearer identifier is used to indicate a bearer type supported by the first transmission resource pool.

For example, it is assumed that the at least one piece of first transmission resource pool configuration information sent by the network device to the terminal includes five pieces of transmission resource pool configuration information, and each piece of transmission resource pool configuration information includes the transmission resource pool identifier, resource configuration information, an area identifier, a service type identifier, and a bearer identifier. Table 1 below shows examples of the five pieces of transmission resource pool configuration information.

TABLE 1

| Transmission resource pool identifier | Resource configuration information | Area identifier | Service type identifier | Bearer identifier |
|---|---|---|---|---|
| TP1 | Resource configuration information 1 | Region 1 | Work 1 | Bean 1 |
| TP2 | Resource configuration information 2 | Region 2 | Work 2 | Bear 2 |
| TP3 | Resource configuration information 3 | Region 3 | Work 3 | Bear 3 |
| TP4 | Resource configuration information 4 | Region 4 | Work 4 | Bear 4 |
| TP5 | Resource configuration information 5 | Region 5 | Work 5 | Bear 5 |

It should be noted that in this embodiment of the present invention, the at least one first transmission resource pool is a hybrid transmission resource pool (HTP). This may be understood as: the at least one first hybrid transmission resource pool may be used as a distributed transmission resource pool for the terminal to send direct link service data in a distributed transmission mode, or may be used as a centralized transmission resource pool for the terminal to send direct link service data in a centralized transmission mode. In this embodiment of the present invention, an example in which the terminal sends the direct link service data in the distributed transmission mode is described.

In this embodiment of the present invention, when the terminal sends the direct link service data to another device, the terminal may send the direct link service data to the another device by using a centralized transmission resource pool or a distributed transmission resource pool configured by the network device for the terminal. To successfully process a service of the terminal and to keep load balancing of transmission resource pools in a network, the network device may further configure a new transmission resource pool for the terminal to share the service of the terminal, or after configuring a new transmission resource pool (for example, the first transmission resource pool), the network device may revoke the new transmission resource pool. It is assumed that the terminal currently sends the direct link service data by using a distributed transmission resource pool. The network device may send the first transmission resource pool configuration information to the terminal, so that the first transmission resource pool is used as a standby transmission resource pool (to be specific, a standby distributed transmission resource pool) for the terminal to send the direct link service data.

It should be noted that in this embodiment of the present invention, the network device may send the first transmission resource pool configuration information to the terminal by using system information or radio resource control (RRC) dedicated signaling. Specifically, the network device may determine, based on an actual use requirement, a manner of sending the first transmission resource pool configuration information to the terminal. This is not limited in this embodiment of the present invention.

S102. The terminal receives the at least one piece of first transmission resource pool configuration information sent by the network device.

In this embodiment of the present invention, the terminal receives the at least one piece of first transmission resource pool configuration information sent by the network device, the terminal may use the first transmission resource pool corresponding to the transmission resource pool identifier in the first transmission resource pool configuration information (the first transmission resource pool configuration information is any one of the at least one piece of first transmission resource pool configuration information) as a standby transmission resource pool of the terminal, and the terminal may store the first transmission resource pool configuration information in the terminal. In a specific condition, the terminal may use the first transmission resource pool as a distributed transmission resource pool of the terminal.

S103. The network device sends first state indication information to the terminal.

In this embodiment of the present invention, after the network device sends the at least one piece of first transmission resource pool configuration information to the terminal, the network device may send the first state indication information to the terminal. The first state indication information is used to indicate that the first transmission resource pool can be used by the terminal to send the direct link service data, in other words, the first transmission resource pool is in a first state.

Optionally, in this embodiment of the present invention, the first state indication information may include any one of first indication information, second indication information, and third indication information. The first indication information includes a second transmission resource pool identifier, the second indication information includes at least an indicator used to indicate a state of the first transmission resource pool, and the third indication information includes a first state activation instruction.

It should be noted that in this embodiment of the present invention, any one of the three pieces of indication information may be selected as the first state indication information based on an actual use requirement. This is not specifically limited in this embodiment of the present invention.

Optionally, in this embodiment of the present invention, the network device may send the first state indication information to the terminal by using the system information or the RRC dedicated signaling, or the network device may send the first state indication information to the terminal by using a media access control (MAC) control element (control element, CE), or the network device may send the first state indication information to the terminal by using a physical downlink control channel (PDCCH).

It should be noted that in this embodiment of the present invention, the network device may determine, based on an actual situation, a manner of sending the first state indication information. This is not specifically limited in this embodiment of the present invention.

S104. The terminal receives the first state indication information sent by the network device.

S105. The terminal determines, based on the first state indication information, that a first transmission resource pool is in a first state.

It should be noted that in this embodiment of the present invention, a state of the first transmission resource pool may include the first state or a second state. This may be understood as: the first transmission resource pool may be used as a distributed transmission resource pool or a centralized transmission resource pool. When a state of the first transmission resource pool is the first state, the first transmission resource pool may be used as a distributed transmission resource pool, or when a state of the first transmission resource pool is the second state, the first transmission resource pool may be used as a centralized transmission resource pool.

In this embodiment of the present invention, after the terminal receives the first state indication information sent by the network device, the terminal may determine, under an indication of the first state indication information, that the first transmission resource pool is in the first state, to be specific, determine that the first transmission resource pool can be used by the terminal to send the direct link service data.

Optionally, in this embodiment of the present invention, the first state indication information may include any one of the first indication information, the second indication information, and the third indication information. Therefore, when the first state indication information is different indication information, S105 may be implemented by using different methods, and specifically, S105 may be implemented by using any method of S105a to S105c.

S105a. If the first state indication information includes first indication information, when a second transmission resource pool identifier in the first indication information is a first transmission resource pool identifier, the terminal determines that the first transmission resource pool corresponding to the first transmission resource pool identifier is in the first state.

In this embodiment of the present invention, a transmission resource pool identifier may indicate a transmission resource pool, and therefore, the network device may add a transmission resource pool identifier (for example, the second transmission resource pool identifier) to the first indication information and send the first indication information to the terminal, so that after the terminal receives the first indication information, the terminal can determine that the second transmission resource pool identifier is the first transmission resource pool identifier, and the terminal determines that the transmission resource pool (namely, the first transmission resource pool) corresponding to the first transmission resource pool identifier is in the first state.

For example, in this embodiment of the present invention, it is assumed that the at least one piece of first transmission resource pool configuration information sent by the network device to the terminal includes five pieces of transmission resource pool configuration information (the five pieces of transmission resource pool configuration information correspond to five transmission resource pools). Five transmission resource pool identifiers in the five pieces of transmission resource pool configuration information are respectively denoted as TP1, TP2, TP3, TP4, and TP5. If the network device indicates that TP2 in the five transmission resource pools is in the first state, the network device may add the identifier TP2 to the first indication information and send the first indication information to the terminal, so that the terminal can determine, based on the identifier TP2 in the first indication information, that a second transmission resource pool in the five transmission resource pools is in the first state.

It should be noted that in this embodiment of the present invention, the first indication information may further carry a plurality of transmission resource pool identifiers used to indicate that the plurality of transmission resource pools are in the first state. For example, if the network device indicates that the TP2 and TP3 in the five transmission resource pools are in the first state, the network device may add two identifiers TP2 and TP3 to the first indication information and send the first indication information to the terminal, so that the terminal determines, based on the identifiers TP2 and TP3, that the second transmission resource pool and a third transmission resource pool in the five transmission resource pools are in the first state.

S105b. If the first state indication information includes second indication information, the terminal determines, based on a first indicator in the second indication information, that the first transmission resource pool is in the first state.

In this embodiment of the present invention, the network device sends the at least one piece of first transmission resource pool configuration information to the terminal, and then the network device sends the second indication information to the terminal. The second indication information includes at least one indicator, and each of the at least one indicator is used to indicate a state of each of the at least one first transmission resource pool. One of the at least one indicator may be the first indicator or a second indicator, the first indicator is used to indicate that a state of a transmission resource pool corresponding to the first indicator is the first state, and the second indicator is used to indicate that a state of a transmission resource pool corresponding to the second indicator is the second state.

In this embodiment of the present invention, the network device may add the at least one indicator to the second indication information and send the second indication information to the terminal, so that the terminal can determine, based on an indicator used to indicate the first transmission resource pool in the at least one indicator in the second indication information, a state of the first transmission resource pool (a state of a transmission resource pool may include the first state or the second state). Specifically, when the indicator used to indicate a state of the first transmission resource pool is the first indicator, the terminal determines that the first transmission resource pool is in the first state; or when the indicator used to indicate the first transmission resource pool is the second indicator, the terminal determines that the first transmission resource pool is in the second state.

Optionally, in this embodiment of the present invention, each indicator (which may be the first indicator or the second indicator) in the at least one indicator may be a bit number of at least 1 bit (bit). The at least one indicator may also be another indicator that can indicate a state of at least one transmission resource pool. This is not specifically limited in this embodiment of the present invention.

In this embodiment of the present invention, it is assumed that each of the at least one indicator is a 1-bit number. The first indicator used to indicate that a state of a transmission resource pool is the first state may be represented by "0" or "1". For example, "0" may be used to indicate that a transmission resource pool is in the first state, or "1" may be used to indicate that a transmission resource pool is in the first state. The second indicator used to indicate that a state of a transmission resource pool is the second state may also be represented by "0" or "1". For example, "o" may be used to indicate that a transmission resource pool is in the second state, or "1" may be used to indicate that a transmission resource pool is in the second state. Certainly, in this embodiment of the present invention, other indicators that meet an actual use requirement may be used to set the at least one indicator, and are not listed one by one in this embodiment of the present invention.

It should be noted that in this embodiment of the present invention, the first indicator and the second indicator in the at least one indicator may be represented by different numbers. For example, with reference to the descriptions of the at least one indicator, if "1" is used to represent the first indicator (indicating that a transmission resource pool is in the first state), "0" may be used to represent the second indicator (indicating that a transmission resource pool is in the second state); or if "0" is used to represent the first indicator, "1" may be used to represent the second indicator.

For example, in this embodiment of the present invention, it is assumed that the at least one piece of first transmission resource pool configuration information sent by the network device to the terminal includes five pieces of transmission resource pool configuration information. The second indication information includes five indicators. Each of the five indicators is a 1-bit number, "1" is used to indicate the first indicator, and "0" is used to indicate the second indicator. If the network device indicates that a second transmission resource pool in five transmission resource pools is in the first state, the network device may add a 5-bit number 01000 to the second indication information and send the second indication information to the terminal. After the terminal receives the second indication information, because a second bit in the bit number 01000 in the second indication information is "1", the terminal can determine that the second transmission resource pool in the five transmission resource pools is in the first state.

It should be noted that in this embodiment of the present invention, the second indication information may indicate that a plurality of transmission resource pools are in the first state. For example, if the network device indicates that the second transmission resource pool and a third transmission resource pool in the five transmission resource pools are in the first state, the network device may send a 5-bit number 01100 to the terminal. Because a second bit is "1" and a third bit is "1" in the bit number 01100, the terminal can determine that the second transmission resource pool and the third transmission resource pool are in the first state.

S105c. If the first state indication information includes third indication information, when receiving the third indication information, the terminal determines that the first transmission resource pool is in the first state.

The third indication information includes the first state activation instruction.

In this embodiment of the present invention, the first state activation instruction may be used to indicate that states of all transmission resource pools (to be specific, states of all transmission resource pools in the at least one piece of first transmission resource pool configuration information sent by the network device) are the first state. The network device may add the first state activation instruction to the third indication information and send the third indication information to the terminal, so that the terminal can determine, based on the first state activation instruction in the third indication information, that the first transmission resource pool is in the first state.

It should be noted that in this embodiment of the present invention, the first state activation instruction may be represented by an identifier "0" or "1". For example, "0" may be used to represent the first state activation instruction, and when the first state activation instruction received by the terminal is "0", it indicates that all transmission resource pools in the at least one first transmission resource pool are in the first state. Alternatively, "1" may be used to represent the first state activation instruction, and when the first state activation instruction received by the terminal is "1", it indicates that all transmission resource pools in the at least one first transmission resource pool are in the first state. Certainly, in this embodiment of the present invention, other identifiers that meet an actual use requirement may be used to set the first state activation instruction, and are not listed one by one in this embodiment of the present invention.

S106. The terminal independently selects a direct link transmission resource from time-frequency transmission resources corresponding to first transmission resource pool resource configuration information.

In this embodiment of the present invention, after the terminal determines that the first transmission resource pool is in the first state, the terminal has a permission to transmit data by using the first transmission resource pool, and the terminal may transmit data by using the first transmission resource pool. Specifically, the terminal may independently select the direct link transmission resource from the time-frequency transmission resources corresponding to the first transmission resource pool resource configuration information.

Optionally, in this embodiment of the present invention, that the terminal independently selects the direct link transmission resource may include: The terminal may randomly select a transmission resource from the first transmission resource pool (in other words, select a transmission resource block from the transmission resource pool) to transmit data. Alternatively, the terminal may select a transmission resource from the first transmission resource pool in a manner of listening before reserving. Specifically, the terminal listens to an unoccupied transmission resource block in the first transmission resource pool, and then the terminal may reserve the unoccupied transmission resource block as a transmission resource block to be used by the terminal.

Optionally, in this embodiment of the present invention, with reference to the related description of S101, when the first transmission resource pool configuration information includes the first area identifier (the first area identifier is used to indicate the available area of the first transmission resource pool), when the terminal determines that the first transmission resource pool is in the first state, and an area identifier (which may be referred to as a second area identifier) corresponding to an area in which the terminal is currently located is the first area identifier, it indicates that the terminal is currently located in the available area of the first transmission resource pool, and the terminal may independently select the direct link transmission resource from the time-frequency transmission resources corresponding to the first transmission resource pool resource configuration information.

When the first transmission resource configuration information includes the first service type identifier (the first service type identifier is used to indicate the service type supported by the first transmission resource pool for transmission), when the terminal determines that the first transmission resource pool is in the first state, and a service type (which may be referred to as a second service type identifier) to which data to be sent by the terminal belongs is the first service type identifier, the terminal may independently select the direct link transmission resource from the time-frequency transmission resources corresponding to the first transmission resource pool resource configuration information.

When the first transmission resource pool configuration information includes the first bearer identifier (the first bearer identifier is used to indicate the bearer type supported by the first transmission resource pool), when the terminal determines that the first transmission resource pool is in the first state, and a second bearer identifier of data currently sent by the terminal is the first bearer identifier, the terminal may independently select the direct link transmission resource from the time-frequency transmission resources corresponding to the first transmission resource pool resource configuration information.

S107. The terminal sends direct link service data by using the direct link transmission resource selected by the terminal.

In this embodiment of the present invention, after the terminal determines that the first transmission resource pool is in the first state, when the terminal needs to use the first transmission resource pool, the terminal may independently select the direct link transmission resource from the time-frequency transmission resources corresponding to the first transmission resource pool configuration information, and then send the direct link service data by using the direct link transmission resource, to ensure that the direct link service data of the terminal is successfully sent to the another device.

According to the transmission resource configuration method provided in this embodiment of the present invention, the network device may send the at least one piece of first transmission resource pool configuration information to the terminal, where a state of each of the at least one first transmission resource pool includes the first state or the second state. After the terminal receives the at least one piece of first transmission resource pool configuration information, when the terminal may determine that the first transmission resource pool (a transmission resource pool in the at least one first transmission resource pool) corresponding to a first transmission resource identifier is in the first state, the terminal independently selects the direct link transmission resource from the time-frequency transmission resources corresponding to the first transmission resource pool resource configuration information, and sends the direct link service data by using the direct link transmission resource. In comparison with the current system, in this embodiment of the present invention, the terminal can determine a state of the first transmission resource pool corresponding to the first transmission resource pool identifier in the at least one piece of first transmission resource pool configuration information received by the terminal. Therefore, the terminal can use the first transmission resource pool in the first state as a distributed transmission resource pool of the terminal, and send the direct link service data in the distributed transmission mode, thereby improving transmission resource utilization.

Figure 5:
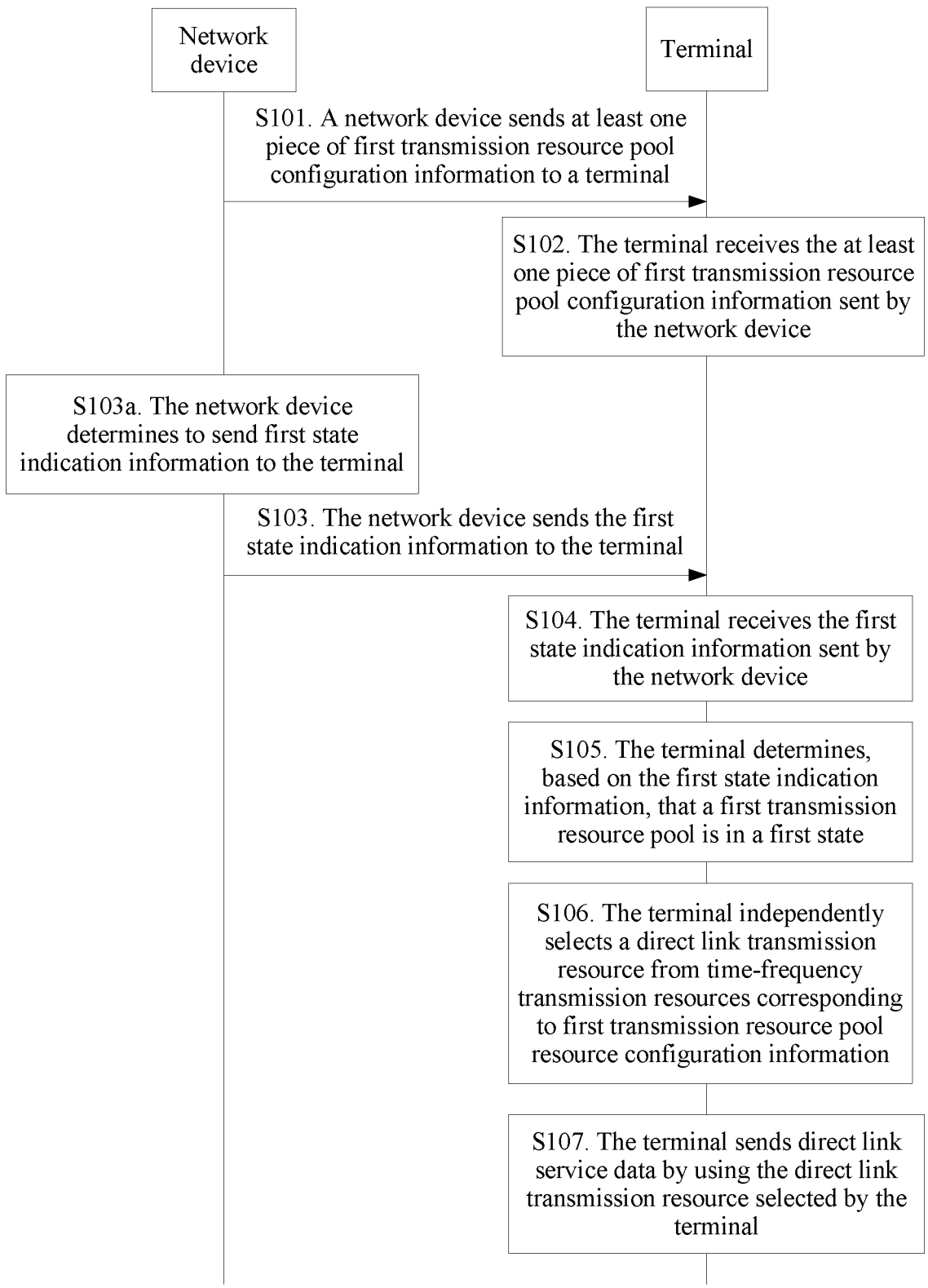
FIG. 5 is a schematic diagram 2 of a transmission resource configuration method according to an embodiment of the present invention.

Optionally, in this embodiment of the present invention, with reference to FIG. 4, as shown in FIG. 5, before S103 (to be specific, before the network device sends the first state indication information to the terminal), the transmission resource configuration method provided in this embodiment of the present invention may further include S103a:

S103a. The network device determines to send first state indication information to the terminal.

In this embodiment of the present invention, after the network device sends the at least one piece of first transmission resource pool configuration information to the terminal, the network device may determine, based on a load status in the network, a current service requirement of the terminal, and the like, whether to send the first state indication information to the terminal. After the network device determines to send the first state indication information to the terminal, the network device may send the first state indication information to the terminal, to indicate a transmission resource pool that is in the first state to the terminal.

Optionally, in this embodiment of the present invention, the network device may determine, based on the load status in the network, whether to send the first state indication information to the terminal. Specifically, in any one of the following three cases: A1 to A3, the network device can determine to send the first state indication information to the terminal.

A1. When the network device detects that load of a second transmission resource pool is greater than a first preset load threshold, the network device determines to send the first state indication information to the terminal.

The second transmission resource pool is a transmission resource pool currently used by the terminal to send the direct link service data, and the second transmission resource pool is a distributed transmission resource pool.

In this embodiment of the present invention, when the network device detects that the load of the second transmission resource pool is greater than the load threshold (referred to as the first preset load threshold below) of the second transmission resource pool, it indicates that the load of the transmission resource pool that is currently used by the terminal to send the direct link service data is relatively high, and the network device needs to configure a new distributed transmission resource pool for the terminal. In this case, the network device determines to send the first state indication information to the terminal. In this way, the network device can configure the first transmission resource pool as a new distributed transmission resource pool for the terminal, and instruct the terminal to independently select the direct link transmission resource from the time-frequency transmission resources corresponding to the first transmission resource pool resource configuration information, so that the first transmission resource pool can share a service of the terminal, and the transmission resource utilization can also be improved.

A2. When the network device detects that load of a centralized transmission resource pool in the network is less than a second preset load threshold, the network device determines to send the first state indication information to the terminal.

In this embodiment of the present invention, when the network device detects that the load of the centralized transmission resource pool in the network is less than the load threshold (referred to as the second preset load threshold below) of the centralized transmission resource pool, it indicates that the load of the centralized transmission resource pool is relatively low, and the network device does not need to configure a new centralized transmission resource pool. In this case, the network device determines to send the first state indication information to the terminal. In this way, the network device can configure the first transmission resource pool as a new distributed transmission resource pool for the terminal, and instruct the terminal to independently select the direct link transmission resource from the time-frequency transmission resources corresponding to the first transmission resource pool resource configuration information, so that the first transmission resource pool can share a service of the terminal, and the transmission resource utilization can also be improved.

A3. When the network device detects that load of a second transmission resource pool is greater than a first preset load threshold, and load of a centralized transmission resource pool in the network is less than a second preset load threshold, the network device determines to send the first state indication information to the terminal.

In this embodiment of the present invention, when the network device detects that the load of the second transmission resource pool is greater than the first preset load threshold and the load of the centralized transmission resource pool in the network is less than the second preset load threshold, it indicates that the load of the distributed transmission resource pool currently used by the terminal is relatively high, and the load of the centralized transmission resource pool in the network is relatively low. In this case, the network device may send the first state indication information to the terminal. In this way, the network device can configure the first transmission resource pool as a new distributed transmission resource pool for the terminal, and instruct the terminal to independently select the direct link transmission resource from the time-frequency transmission resources corresponding to the first transmission resource pool resource configuration information, so that the first transmission resource pool can share a service of the terminal, and the transmission resource utilization can also be improved.

Optionally, in this embodiment of the present invention, the network device may determine, based on the current service requirement of the terminal, whether to send the first state indication information to the terminal. Specifically, in the following case B1, the network device can determine to send the first state indication information to the terminal.

B1. When the network device detects that the terminal has a large quantity of delay-sensitive services, the network device determines to send the first state indication information to the terminal.

In this embodiment of the present invention, when the network device detects that the terminal has a large quantity of delay-sensitive services, in other words, the terminal has a large quantity of services with a relatively high delay requirement, the distributed transmission resource pool (namely, the second transmission resource pool) currently used by the terminal cannot meet requirements of the services with a relatively high delay requirement, in other words, the terminal cannot process the services with a relatively high delay requirement in a timely manner. As a result, the terminal cannot successfully process the services. In this case, the network device may determine to send the first state indication information to the terminal. In this way, the network device can configure the first transmission resource pool as a new distributed transmission resource pool for the terminal based on the first state indication information, and instruct the terminal to independently select the direct link transmission resource from the time-frequency transmission resources corresponding to the first transmission resource pool resource configuration information, so that the first transmission resource pool can share a service (in particular, the foregoing delay-sensitive services) of the terminal, it is ensured that the terminal successfully processes the service, and the transmission resource utilization can also be improved.

Figure 6:
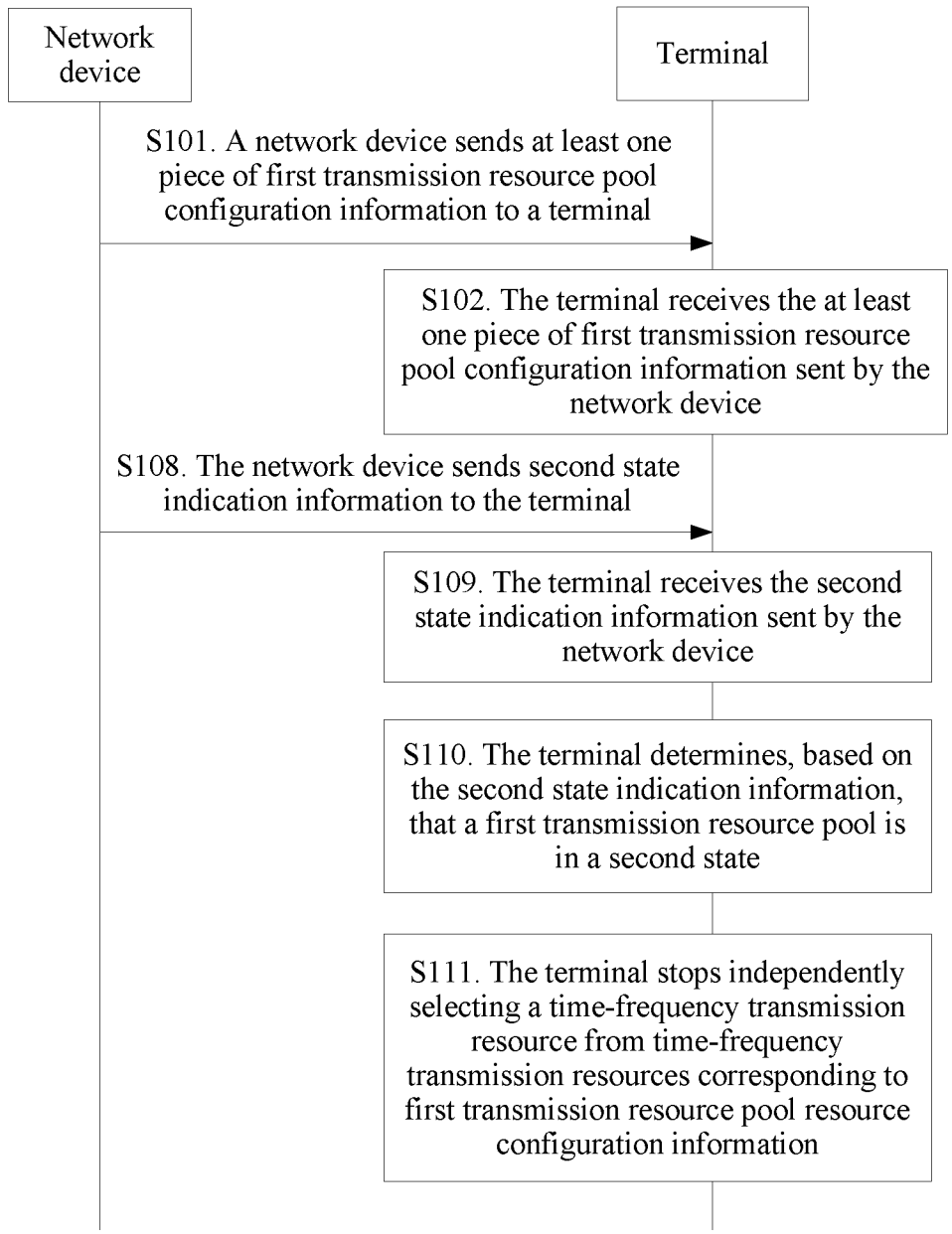
FIG. 6 is a schematic diagram 3 of a transmission resource configuration method according to an embodiment of the present invention.

Optionally, in this embodiment of the present invention, as shown in FIG. 6, after S101 (to be specific, after the network device sends the at least one piece of transmission resource pool configuration information to the terminal), the transmission resource configuration method provided in this embodiment of the present invention may further include S108 to S111.

S108. The network device sends second state indication information to the terminal.

In this embodiment of the present invention, after the network device sends the at least one piece of first transmission resource pool configuration information to the terminal, the network device may send the second state indication information to the terminal. The second state indication information is used to indicate that the first transmission resource pool cannot be used by the terminal to send the direct link service data, in other words, the first transmission resource pool is in the second state.

Optionally, in this embodiment of the present invention, the second state indication information may include any one of fourth indication information, fifth indication information, and sixth indication information. The fourth indication information includes a third transmission resource pool identifier, the fifth indication information includes at least an indicator used to indicate a state of the first transmission resource pool, and the third state indication information includes a second state activation instruction.

It should be noted that in this embodiment of the present invention, any one of the three pieces of indication information may be selected as the second state indication information based on an actual use requirement. This is not specifically limited in this embodiment of the present invention.

Optionally, in this embodiment of the present invention, the network device may send the second state indication information to the terminal by using the system information or RRC dedicated signaling, or the network device may send the second state indication information to the terminal by using the Media Access Control control element MAC CE, or the network device may send the second state indication information to the terminal by using the PDCCH.

It should be noted that in this embodiment of the present invention, the network device may determine, based on an actual situation, a manner of sending the second state indication information. This is not specifically limited in this embodiment of the present invention.

Execution sequences of S108 and S102 may not be limited in this embodiment of the present invention. To be specific, in this embodiment of the present invention, S108 may be performed before S102, or S102 may be performed before S108, or S108 and S102 may be simultaneously performed.

S109. The terminal receives the second state indication information sent by the network device.

S110. The terminal determines, based on the second state indication information, that the first transmission resource pool is in a second state.

In this embodiment of the present invention, after the terminal receives the second state indication information sent by the network device, the terminal may determine, under an indication of the second state indication information, that the first transmission resource pool is in the second state, to be specific, determine that the first transmission resource pool can no longer be used by the terminal to send the direct link service data.

Optionally, in this embodiment of the present invention, the second state indication information may include any one of the fourth indication information, the fifth indication information, and the sixth indication information. Therefore, when the second state indication information is different indication information, S110 may be implemented by using different methods, and specifically, S110 may be implemented by using any method of S110a to S110c.

S110a. If the second state indication information includes fourth indication information, when a third transmission resource pool identifier in the fourth indication information is the first transmission resource pool identifier, the terminal determines that the first transmission resource pool corresponding to the first transmission resource pool identifier is in the second state.

In this embodiment of the present invention, the network device may add a transmission resource pool identifier (for example, the third transmission resource pool identifier) to the fourth indication information and send the fourth indication information to the terminal, so that after the terminal receives the fourth indication information, the terminal can determine that the third transmission resource pool identifier in the fourth indication information is the first transmission resource pool identifier, and the terminal determines that the transmission resource pool (namely, the first transmission resource pool) corresponding to the first transmission resource pool identifier is in the second state.

For example, in this embodiment of the present invention, it is assumed that the at least one piece of first transmission resource pool configuration information sent by the network device to the terminal includes five pieces of transmission resource pool configuration information (the five pieces of transmission resource pool configuration information correspond to five transmission resource pools). Five transmission resource pool identifiers in the five pieces of transmission resource pool configuration information are respectively denoted as TP1, TP2, TP3, TP4, and TP5. After the network device indicates that TP2 in the five transmission resource pools is in the first state, if the network device indicates that the TP2 that has been in the first state can no longer be used by the terminal to send the direct link service data, the network device may add the identifier TP2 to the fourth indication information and send the fourth indication information to the terminal, so that the terminal can determine, based on the identifier TP2 in the fourth indication information, that a second transmission resource pool in the five transmission resource pools is in the second state.

S110b. If the second state indication information includes fifth indication information, the terminal determines, based on a second indicator in the fifth indication information, that the first transmission resource pool is in the second state.

It should be noted that in this embodiment of the present invention, the fifth indication information includes at least one indicator, and the at least one indicator is similar to the at least one indicator in the second indication information in S105b. For a detailed description of the at least one indicator in the fifth indication information, refer to the related description of the at least one indicator in the second indication information in S105b. Details are not described herein again.

For example, in this embodiment of the present invention, it is assumed that the at least one piece of first transmission resource pool configuration information sent by the network device to the terminal includes five pieces of transmission resource pool configuration information, and the fifth indication information includes five indicators. Each of the five indicators is a 1-bit number, "1" is used to represent the first indicator, and "0" is used to represent the second indicator. Each of the five indicators is a 1-bit number. After the network device indicates that a second transmission resource pool in five transmission resource pools is in the first state, if the network device may indicate that the transmission resource pool (namely, the second transmission resource pool in the five transmission resource pools) that has been in the first state can no longer be used by the terminal to send the direct link service data, the network device may add a 5-bit number 10111 to the fifth indication information and send the fifth indication information to the terminal. After the terminal receives the fifth indication information, because a second bit in the bit number 10111 in the fifth indication information is "0", the terminal can determine that the second transmission resource pool in the five transmission resource pools is in the second state.

S110c. If the second state indication information includes sixth indication information, when the terminal receives the sixth indication information, the terminal determines that the first transmission resource pool is in the second state.

The sixth indication information includes the second state activation instruction.

In this embodiment of the present invention, the second state activation instruction may be used to indicate that states of all transmission resource pools (to be specific, states of all transmission resource pools in the at least one piece of first transmission resource pool configuration information sent by the network device) are the second state. The network device may add the second state activation instruction to the sixth indication information and send the sixth indication information to the terminal, so that the terminal can determine, based on the second state activation instruction in the sixth indication information, that the first transmission resource pool is in the second state.

It should be noted that in this embodiment of the present invention, the second state activation instruction may be represented by an identifier "0" or "1". For example, "0" may be used to represent the second state activation instruction, and when the second state activation instruction received by the terminal is "0", it indicates that all transmission resource pools in the at least one first transmission resource pool are in the second state. Alternatively, "1" may be used to represent the second state activation instruction, and when the second state activation instruction received by the terminal is "1", it indicates that all transmission resource pools in the at least one first transmission resource pool are in the second state. Certainly, in this embodiment of the present invention, other identifiers that meet an actual use requirement may be used to set the second state activation instruction, and are not listed one by one in this embodiment of the present invention.

S111. The terminal stops independently selecting a time-frequency transmission resource from the time-frequency transmission resources corresponding to the first transmission resource pool resource configuration information.

In this embodiment of the present invention, when the terminal determines that the first transmission resource pool is in the second state, the terminal can no longer use the first transmission resource pool to send the direct link service data, and therefore, the terminal stops independently selecting a time-frequency transmission resource from the time-frequency transmission resources corresponding to the first transmission resource pool resource configuration information, and the first transmission resource pool can be used by another terminal to send direct link service data in a centralized transmission mode.

Figure 7:
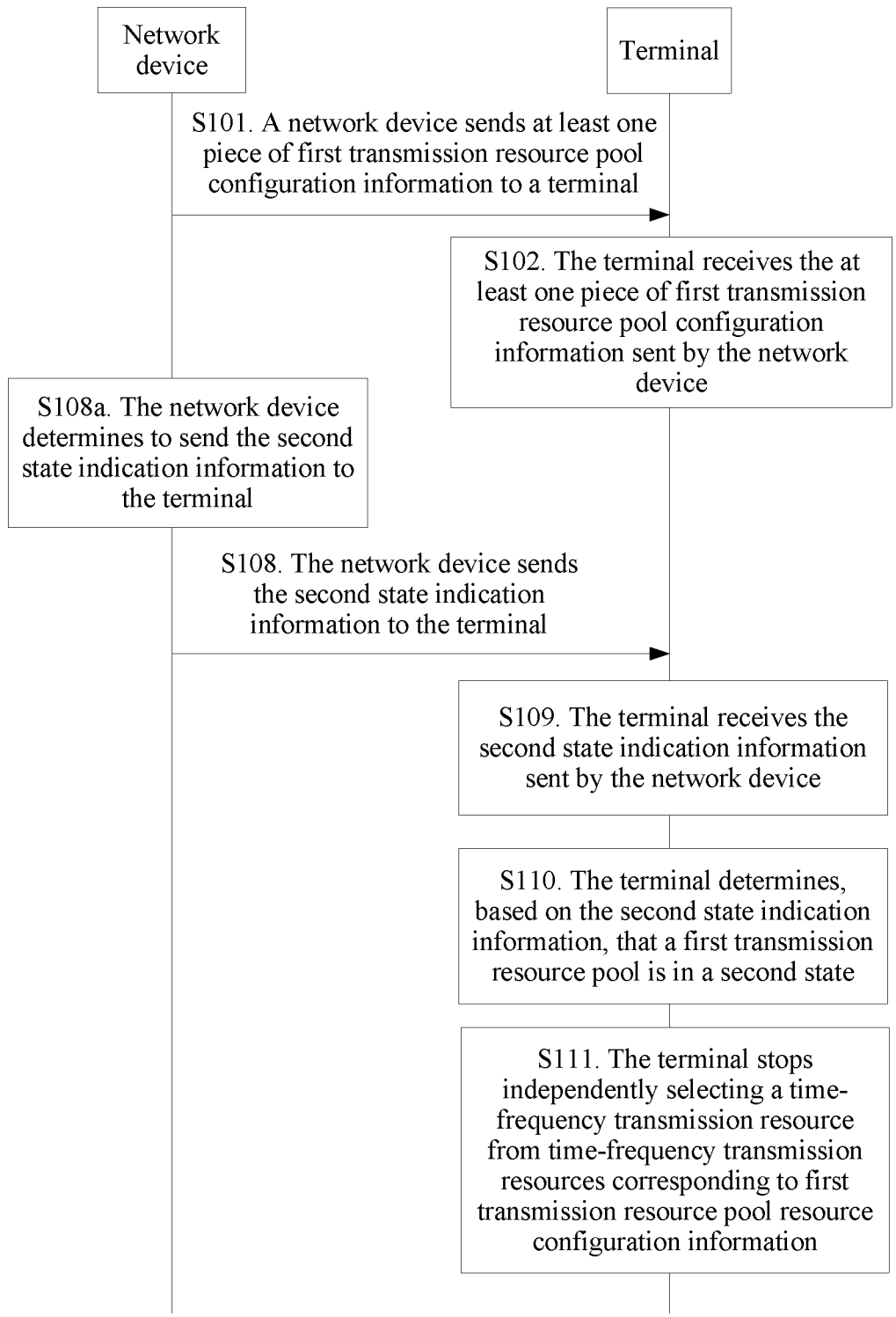
FIG. 7 is a schematic diagram 4 of a transmission resource configuration method according to an embodiment of the present invention.

Optionally, in this embodiment of the present invention, with reference to FIG. 6, as shown in FIG. 7, before S108, the transmission resource configuration method provided in this embodiment of the present invention may further include S108*a*:

S108*a*. The network device determines to send the second state indication information to the terminal.

In this embodiment of the present invention, the network device sends the first state indication information to the terminal, and the terminal determines, based on the first state indication information, that the first transmission resource pool is in the first state. In addition, after the terminal sends the direct link service data by using the direct link transmission resource selected by the terminal from the first transmission resource pool, the network device may determine, based on a load status in the network, a current service requirement of the terminal, or the like, whether to send the second state indication information to the terminal. After the network device determines to send the second state indication information to the terminal, the network device may send the second state indication information to the terminal, to indicate a transmission resource pool that is in the second state to the terminal.

Optionally, in this embodiment of the present invention, the network device may determine, based on the load status in the network, whether to send the second state indication information to the terminal. Specifically, in any one of the following three cases: C1 to C3, the network device can determine to send the second state indication information to the terminal.

C1. When the network device detects that load of the first transmission resource pool is less than a third preset load threshold, the network device determines to send the second state indication information to the terminal.

In this embodiment of the present invention, when the network device detects that the load of the first transmission resource pool is less than the load threshold (referred to as the third preset load threshold below) of the first transmission resource pool, it indicates that the load of the first transmission resource pool is relatively low, and transmission resources used by the terminal to send the direct link service data is relatively sufficient. To avoid a transmission resource waste, in this case, the network device determines to send the second state indication information to the terminal, so that the network device can stop the terminal from using the first transmission resource pool to send the direct link service data (stop the terminal from using the first transmission resource pool as a distributed transmission resource pool), and the first transmission resource pool can be used as a centralized transmission resource pool for another terminal to transmit data, thereby improving the transmission resource utilization.

C2. When the network device detects that the load of the centralized transmission resource pool in the network is greater than the second preset load threshold, the network device determines to send the second state indication information to the terminal.

In this embodiment of the present invention, when the network device detects that the load of the centralized transmission resource pool in the network is greater than the load threshold (namely, the second preset load threshold) of the centralized transmission resource pool, it indicates that the load of the centralized transmission resource pool is relatively high, and the network device needs to configure a new centralized transmission resource pool. In this case, the network device determines to send the second state indication information to the terminal. In this way, the network device can instruct the terminal not to use the first transmission resource pool (the first transmission resource pool is used as a distributed transmission resource pool) to send the direct link service data, and the first transmission resource pool can be used as a centralized transmission resource pool for another terminal to transmit data, thereby improving the transmission resource utilization.

C3. When the network device detects that load of the first transmission resource pool is less than a third preset load threshold, and the load of the centralized transmission resource pool in the network is greater than the second preset load threshold, the network device determines to send the second state indication information to the terminal.

In this embodiment of the present invention, when the network device detects that the load of the first transmission resource pool is less than the third preset load threshold and the load of the centralized transmission resource pool in the network is greater than the second preset load threshold, it indicates that the load of the first transmission resource pool currently used by the terminal is relatively low, and the load of the centralized transmission resource pool in the network is relatively high. In this case, the network device may send the second state indication information to the terminal. In this way, the network device can instruct the terminal not to use the first transmission resource pool (the first transmission resource pool is used as a distributed transmission resource pool) to send the direct link service data, and the first transmission resource pool can be used as a centralized transmission resource pool for another terminal to transmit data, thereby improving the transmission resource utilization.

Optionally, in this embodiment of the present invention, the network device may determine, based on the current service requirement of the terminal, whether to send the second state indication information to the terminal. Specifically, in the following case D1, the network device can determine to send the second state indication information to the terminal.

D1. When the network device detects that the terminal no longer generates a delay-sensitive service, the network device determines to send the second state indication information to the terminal.

In this embodiment of the present invention, when the network device detects that there is no large quantity of delay-sensitive services on the terminal, in other words, when the terminal may have no service with a relatively high delay requirement, it indicates that transmission resources used by the terminal to send the direct link service data are relatively sufficient. In this case, the network device may determine to send the second state indication information to the terminal. In this way, the network device can instruct the terminal not to use the first transmission resource pool (the first transmission resource pool is used as a distributed transmission resource pool) to send the direct link service data, and the first transmission resource pool can be used as a centralized transmission resource pool for another terminal to transmit data, thereby improving transmission resource utilization.

Optionally, in this embodiment of the present invention, after the terminal independently selects the direct link transmission resource from the time-frequency transmission resources corresponding to the first transmission resource pool resource configuration information, and sends the direct link service data by using the transmission resource, the network device may send the second state indication information to the terminal in a specific condition. The second state indication information is used to indicate that the first transmission resource pool can no longer be used by the terminal to send the direct link service data. To be specific, the network device may alternatively send the second state indication information to the terminal after S107 (to be specific, the terminal sends the direct link service data by using the direct link transmission resource selected by the terminal). In other words, S108 to S111 may be alternatively performed after S107.

At this point, it may be understood that in the transmission resource configuration method provided in this embodiment of the present invention, that the terminal determines a state of a transmission resource pool by using the explicit method is: determining, by the terminal, the state of the transmission resource pool based on the first state indication information or the second state indication information sent by the network device.

Figure 8:
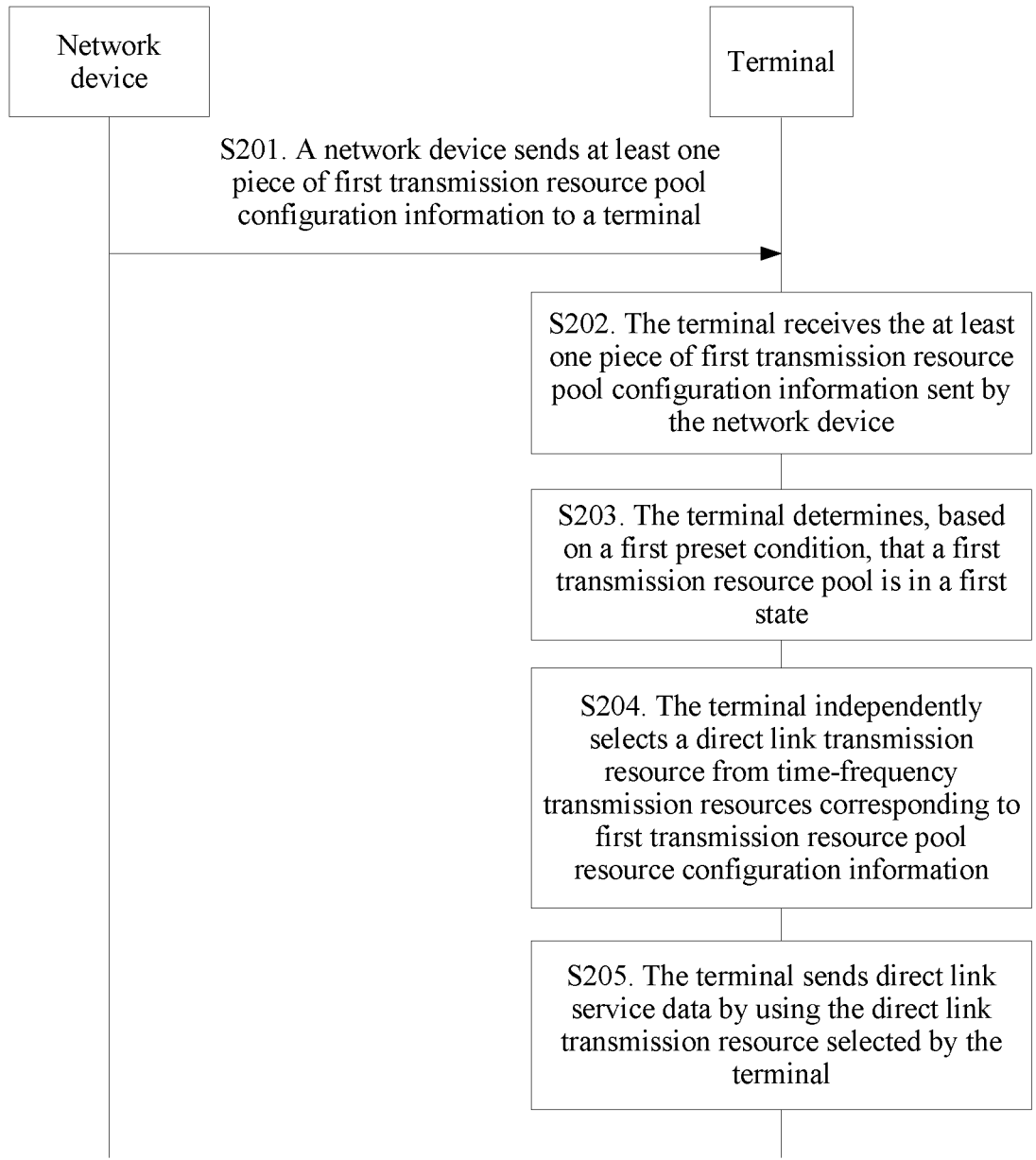
FIG. 8 is a schematic diagram 5 of a transmission resource configuration method according to an embodiment of the present invention.

The following uses an implicit method as an example to describe a transmission resource configuration method provided in an embodiment of the present invention. As shown in FIG. 8, the method may include S201 to S205.

S201. A network device sends at least one piece of first transmission resource pool configuration information to a terminal.

In this embodiment of the present invention, the first transmission resource pool configuration information includes all the content described in S101. In addition, the first transmission resource pool configuration information may further include a first threshold and a second threshold, and the first threshold includes at least one of a first load threshold, a first signal quality threshold, and a first priority threshold, and the second threshold includes at least one of a second load threshold, a second signal quality threshold, and a second priority threshold.

For other descriptions of S201, refer to the related description of S101 in the foregoing embodiment. Details are not described herein again.

S202. The terminal receives the at least one piece of first transmission resource pool configuration information sent by the network device.

For a detailed description of S202, refer to the related description of S102 in the foregoing embodiment. Details are not described herein again.

S203. The terminal determines, based on a first preset condition, that a first transmission resource pool is in a first state.

In this embodiment of the present invention, the first preset condition may include that load of a second transmission resource pool (to be specific, a transmission resource pool currently used by the terminal to send direct link service data) is greater than or equal to the first load threshold, and/or signal quality of the network device is less than or equal to the first signal quality threshold, and/or a priority of data to be transmitted by the terminal is higher than or equal to the first priority threshold. The first preset condition may be used by the terminal to determine whether the first transmission resource pool is in the first state.

Specifically, with reference to FIG. 8, based on different content of the first preset condition, the terminal may specifically determine, based on the first preset condition by using at least one of E1 to E3, that the first transmission resource pool is in the first state.

E1. If the first threshold includes the first load threshold, when the load of the second transmission resource pool is greater than or equal to the first load threshold, the terminal determines that the first transmission resource pool corresponding to the first load threshold is in the first state.

In this embodiment of the present invention, the terminal may determine, based on a load status of the transmission resource pool (namely, the second transmission resource pool) that is currently used by the terminal to send the direct link service data, a transmission resource pool that may be in the first state in at least one transmission resource pool. When the terminal detects that the load of the second transmission resource pool is greater than or equal to the first load threshold, it indicates that the load of the second transmission resource pool is relatively high. In this case, the terminal may determine that the first transmission resource pool corresponding to the first load threshold is in the first state, and the terminal may independently select a direct link transmission resource from time-frequency transmission resources corresponding to first transmission resource pool resource configuration information, so that a service of the terminal can be shared, and transmission resource utilization can also be improved.

For example, in this embodiment of the present invention, it is assumed that the at least one piece of first transmission resource pool configuration information sent by the network device to the terminal includes five pieces of transmission resource pool configuration information. Table 2 below shows examples of five load thresholds in the five pieces of transmission resource pool configuration information.

TABLE 2

| Transmission resource pool | Load threshold |
| --- | --- |
| TP1 | 0.7 |
| TP2 | 0.5 |
| TP3 | 0.65 |
| TP4 | 0.8 |
| TP5 | 0.75 |

It is assuming that the load of the second transmission resource pool is 0.6. With reference to Table 2, it can be learned that the load of the second transmission resource pool is greater than a load threshold corresponding to TP2, and the terminal determines that the TP2 is in the first state.

It should be noted that in this embodiment of the present invention, if the load of the second transmission resource pool is greater than or equal to load thresholds corresponding to some (for example, two) transmission resource pools in the five transmission resource pools in Table 2, the terminal determines that the two transmission resource pools are in the first state.

E2. If the first threshold includes the first signal quality threshold, when the signal quality of the network device is less than or equal to the first signal quality threshold, the terminal determines that the first transmission resource pool corresponding to the first signal quality threshold is in the first state.

In this embodiment of the present invention, the terminal may determine, based on the signal quality of the network device, a transmission resource pool that may be in the first state in at least one transmission resource pool. When the terminal detects that the signal quality of the network device is less than or equal to the first signal quality threshold, it indicates that the signal quality of the network device is relatively poor, and a service of the terminal cannot be successfully processed. In this case, the terminal may determine that the first transmission resource pool corresponding to the first signal quality threshold is in the first state, and then the terminal may independently select a direct link transmission resource from time-frequency transmission resources corresponding to first transmission resource pool resource configuration information, so that the service of the terminal can be shared, it is ensured that the service of the terminal is successfully processed, and transmission resource utilization can also be improved.

For example, in this embodiment of the present invention, the signal quality of the network device may be reference signal receiving power (reference signal receiving power, RSRP). It is assumed that the at least one piece of first transmission resource pool configuration information sent by the network device to the terminal includes five pieces of transmission resource pool configuration information. Table 3 below shows examples of five signal quality thresholds in the five pieces of transmission resource pool configuration information.

TABLE 3

| Transmission resource pool | Signal quality threshold |
| --- | --- |
| TP1 | −100 (decibel-milliwatt) dBm |
| TP2 | −50 dBm |
| TP3 | −80 dBm |
| TP4 | −60 dBm |
| TP5 | −90 dBm |

It is assumed that the RSRP of the network device is −55 dBm, and with reference to Table 3, it can be learned that the reference signal receive power of the network device is less than an RSRP threshold corresponding to TP2, and the terminal determines that the TP2 is in the first state.

E3. If the first threshold includes the first priority threshold, when the priority of the data to be transmitted by the terminal is higher than or equal to the first priority threshold, the terminal determines that the first transmission resource pool corresponding to the first priority threshold is in the first state.

In this embodiment of the present invention, the terminal may determine, based on the priority of the data to be transmitted by the terminal, a transmission resource pool that may be in the first state in the at least one transmission resource pool. When the priority of the data to be transmitted by the terminal is higher than or equal to the first priority threshold, it indicates that a priority of a service of the terminal is relatively high. In this case, the terminal may determine that the first transmission resource pool corresponding to the first priority threshold is in the first state, and then the terminal may independently select a direct link transmission resource from time-frequency transmission resources corresponding to first transmission resource pool resource configuration information, so that the service of the terminal can be shared, it is ensured that the service of the terminal is successfully processed, and transmission resource utilization can also be improved.

For example, in this embodiment of the present invention, it is assumed that the at least one piece of first transmission resource pool configuration information sent by the network device to the terminal includes five pieces of transmission resource pool configuration information. Table 4 below shows examples of five priority thresholds in the five pieces of transmission resource pool configuration information.

TABLE 4

| Transmission resource pool | Priority threshold |
| --- | --- |
| TP1 | 5 |
| TP2 | 1 |
| TP3 | 3 |
| TP4 | 6 |
| TP5 | 4 |

In Table 4, a larger priority threshold indicates a higher priority. It is assumed that the priority of the data to be transmitted by the terminal is 2. With reference to Table 4, it can be learned that the priority of the data to be transmitted by the terminal is higher than a priority threshold corresponding to TP2, and the terminal determines that the TP2 is in the first state.

It should be noted that in Table 4, a larger priority value corresponds to a higher priority level. Certainly, in actual application, a correspondence between a priority value and a priority level may alternatively be that a larger priority value corresponds to a lower priority level. Specifically, the correspondence may be set based on an actual use requirement. This is not limited in this embodiment of the present invention.

Optionally, this embodiment describes the method for separately determining, by using the three methods E1, E2, and E3, that the first transmission resource pool is in the first state. In an actual application, at least one method of E1, E2, and E3 is selected, for example, any one method of E1, E2, E3, E1+E2 (which represents that two conditions corresponding to E1 and E2 are met), E1+E3, E2+E3, and E1+E2+E3 may be selected to determine that the first transmission resource pool is in the first state. The method may be specifically determined based on an actual use requirement, and this is not limited in this embodiment of the present invention.

S204. The terminal independently selects a direct link transmission resource from time-frequency transmission resources corresponding to first transmission resource pool resource configuration information.

S205. The terminal sends direct link service data by using the direct link transmission resource selected by the terminal.

For descriptions of S204 and S205, refer to the related descriptions of S106 and S107 in the foregoing embodiment. Details are not described herein again.

According to the transmission resource configuration method provided in this embodiment of the present invention, the network device may send the at least one piece of first transmission resource pool configuration information to the terminal, where a state of each of at least one first transmission resource pool includes the first state or a second state. After the terminal receives the at least one piece of first transmission resource pool configuration information, when the terminal may determine that the first transmission resource pool (a transmission resource pool in the at least one first transmission resource pool) corresponding to a first transmission resource identifier is in the first state, the terminal independently selects the direct link transmission resource from the time-frequency transmission resources corresponding to the first transmission resource pool resource configuration information, and sends the direct link service data by using the direct link transmission resource. In comparison with the current system, in this embodiment of the present invention, the terminal can determine a state of the first transmission resource pool corresponding to the first transmission resource pool identifier in the at least one piece of first transmission resource pool configuration information received by the terminal. Therefore, the terminal can use the first transmission resource pool in the first state as a distributed transmission resource pool of the terminal, and send the direct link service data in a distributed transmission mode, thereby improving the transmission resource utilization.

Figure 9:
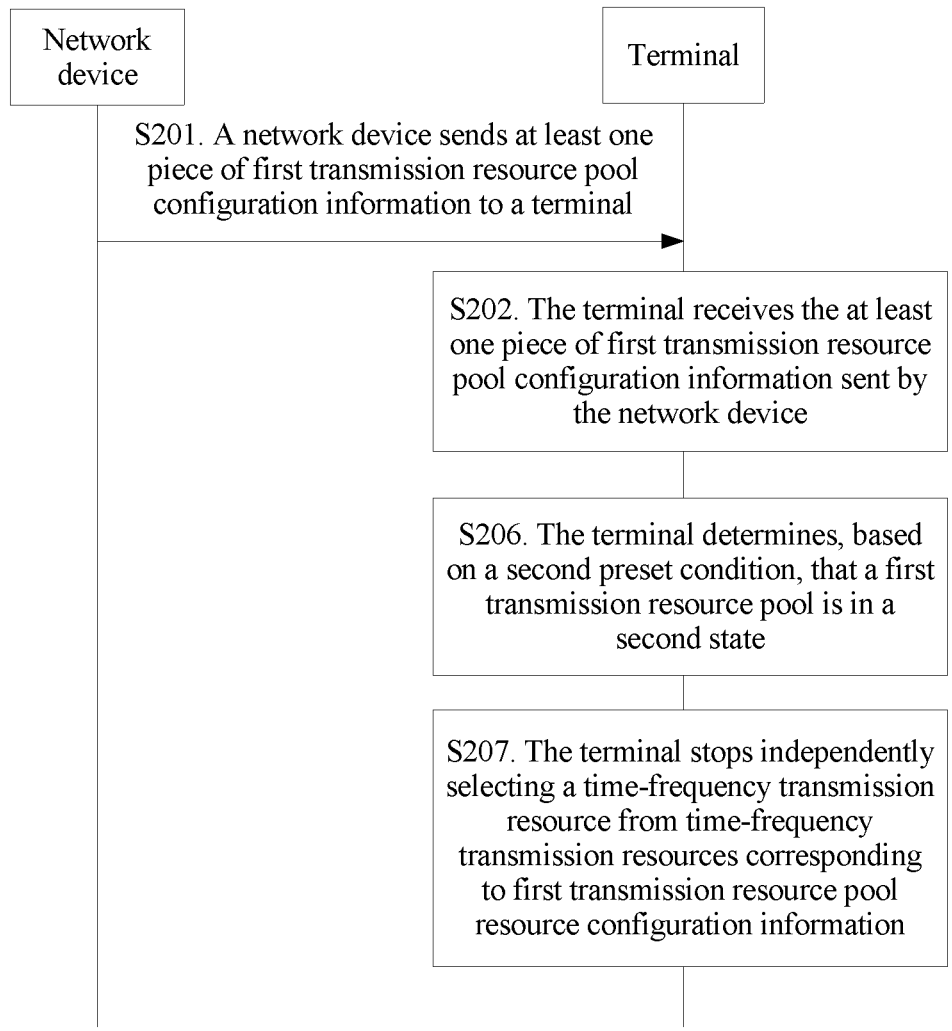
FIG. 9 is a schematic diagram 6 of a transmission resource configuration method according to an embodiment of the present invention.

Optionally, in this embodiment of the present invention, as shown in FIG. 9, after S201 (to be specific, after the network device sends the at least one piece of transmission resource pool configuration information to the terminal), the transmission resource configuration method provided in this embodiment of the present invention may further include S206 and S207.

S206. The terminal determines, based on a second preset condition, that the first transmission resource pool is in a second state.

In this embodiment of the present invention, the second preset condition may include that load of the first transmission resource pool is less than a second load threshold, and/or the signal quality of the network device is greater than a second signal quality threshold, and/or the priority of the data to be transmitted by the terminal is lower than the first priority threshold. The second preset condition may be used by the terminal to determine whether the first transmission resource pool is in the second state.

Specifically, with reference to FIG. 9, based on different content of the second preset condition, the terminal may determine, based on the second preset condition by using at least one of F1 to F3, that the first transmission resource pool is in the second state.

F1. If the second threshold includes the second load threshold, when the load of the first transmission resource pool is less than the second load threshold, the terminal determines that the first transmission resource pool corresponding to the second load threshold is in the second state.

In this embodiment of the present invention, the terminal may determine, based on a load status of the first transmission resource pool, whether the first transmission resource pool may be in the second state. When the terminal detects that the load of the first transmission resource pool is less than the second load threshold corresponding to the first transmission resource pool, it indicates that the load of the first transmission resource pool is relatively low. In this case, the terminal may determine that the first transmission resource pool is in the second state, the terminal no longer uses the first transmission resource pool to send the direct link service data, and the first transmission resource pool can be used by another terminal to transmit data, thereby improving the transmission resource utilization.

F2. If the second threshold includes the second signal quality threshold, when the signal quality of the network device is greater than the second signal quality threshold, the terminal determines that the first transmission resource pool corresponding to the second signal quality threshold is in the second state.

In this embodiment of the present invention, the terminal may determine, based on the signal quality of the network device, whether the first transmission resource pool may be in the second state. When the terminal detects that the signal quality (for example, the RSRP) of the network device is greater than the second signal quality threshold, it indicates that the signal quality of the network device is relatively good. In this case, the terminal may determine that the first transmission resource pool corresponding to the second signal quality threshold is in the second state, the terminal no longer uses the first transmission resource pool to transmit data, and the first transmission resource pool can be used by another terminal to transmit data, thereby improving transmission resource utilization.

F3. If the first threshold includes the second priority threshold, when the priority of the data to be transmitted by the terminal is lower than the second priority threshold, the terminal determines that the first transmission resource pool corresponding to the second priority threshold is in the second state.

In this embodiment of the present invention, the terminal may determine, based on the priority of the data to be transmitted by the terminal, whether the first transmission resource pool may be in the second state, and when the priority of the data to be transmitted by the terminal is lower than the second priority threshold, it indicates that a priority of a service of the terminal is relatively low. In this case, the terminal may determine that the first transmission resource pool corresponding to the second priority threshold is in the second state, the terminal no longer uses the second transmission resource pool to send the direct link service data, and the first transmission resource pool can be used by another terminal to transmit data, thereby improving the transmission resource utilization.

Optionally, this embodiment describes the method for separately determining, by using the three methods F1, F2, and F3, that the first transmission resource pool is in the second state. In an actual application, at least one method of F1, F2, and F3 is selected, for example, any one method of F1, F2, F3, F1+F2 (which represents that two conditions corresponding to F1 and F2 are met), F1+F3, F2+F3, and F1+F2+F3 may be selected to determine that the first transmission resource pool is in the second state. The method may be specifically determined based on an actual use requirement, and this is not limited in this embodiment of the present invention.

S207. The terminal stops independently selecting a time-frequency transmission resource from the time-frequency transmission resources corresponding to the first transmission resource pool resource configuration information.

For a description of S207, refer to the related description of S111 in the foregoing embodiment. Details are not described herein again.

Similarly, in this embodiment of the present invention, after S205 (to be specific, after the terminal sends the direct link service data by using the direct link transmission resource selected by the terminal), the terminal may alternatively determine, based on the second preset condition, that the first transmission resource pool is in the second state. In other words, S206 and S207 may be alternatively performed after S205.

At this point, it may be understood that in the transmission resource configuration method provided in this embodiment of the present invention, that the terminal determines a state of a transmission resource pool by using the implicit method is: independently determining, by the terminal, the state of the transmission resource pool based on the first preset condition or the second preset condition.

The foregoing mainly describes the solutions provided in the embodiments of the present invention from the perspective of interaction between network elements. It may be understood that to implement the foregoing function, the network elements, such as the terminal and the network device, include a corresponding hardware structure and/or software module for performing each function. A person skilled in the art should be easily aware that, in combination with units and algorithm steps in the examples described in the embodiments disclosed in this specification, the embodiments of the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, the terminal and the network device may be divided into function modules based on the foregoing method example. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in actual implementation.

Figure 10:
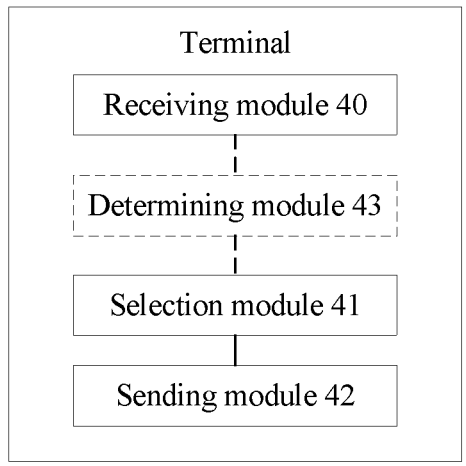
FIG. 10 is a schematic structural diagram 1 of a terminal according to an embodiment of the present invention.

When each function module is obtained through division based on each corresponding function, FIG. 10 is a possible schematic structural diagram of the terminal in the foregoing embodiments. As shown in FIG. 10, the terminal may include a receiving module 40, a selection module 41, and a sending module 42. The receiving module 40 may be configured to support the terminal in performing S102, S104, S109, and S202 in the method embodiments. The selection module 41 may be configured to support the terminal in performing S106, S111, S204, and S207 in the method embodiments. The sending module 42 may be configured to support the terminal in performing S107 and S205 in the method embodiments. Optionally, as shown in FIG. 10, the terminal may further include a determining module 43. The determining module 43 may be configured to support the terminal in performing S105 (including S105a to S105c), S110 (including S110a to S110c), S203, and S206 in the method embodiments. All related content of steps in the foregoing method embodiments may be cited in function descriptions of corresponding function modules. Details are not described herein again.

Figure 11:
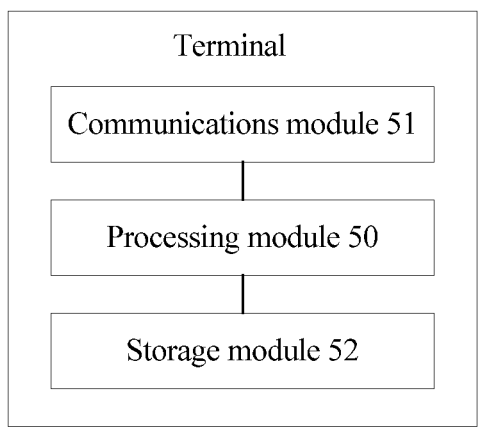
FIG. 11 is a schematic structural diagram 2 of a terminal according to an embodiment of the present invention.

When an integrated unit is used, FIG. 11 is a possible schematic structural diagram of the terminal in the foregoing embodiments. As shown in FIG. 11, the terminal may include a processing module 50 and a communications module 51. The processing module 50 may be configured to control and manage an action of the terminal. For example, the processing module 50 may be configured to support the terminal in performing S105 (including S105a to S105c), S106, S110 (including S110a to S110c), S111, S203, S204, S206, and S207 in the method embodiments, and/or is configured for another process of the technology described in this specification. The communications module 51 may be configured to support communication between the terminal and another network entity, for example, the communications module 51 may be configured to support the terminal in performing S102, S104, S107, S109, S202, and S205 in the method embodiments. Optionally, as shown in FIG. 11, the terminal may further include a storage module 52, configured to store program code and data of the terminal.

The processing module 50 may be a processor or a controller (for example, may be the processor 30 in FIG. 3), for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 50 may implement or execute various example logical blocks, modules, and circuits described with reference to content disclosed in the embodiments of the present invention. Alternatively, the processor may be a combination of processors implementing a computing function, for example, a combination that includes one or more microprocessors, or a combination of a DSP and a microprocessor. The communications module 51 may be a transceiver, a transceiver circuit, a communications interface, or the like (for example, may be the RF circuit 31 shown in FIG. 3). The storage module 52 may be a memory (for example, may be the memory 33 shown in FIG. 3).

When the processing module 50 is a processor, the communications module 51 is a transceiver, and the storage module 52 is a memory, the processor, the transceiver, and the memory may be connected via a bus. The bus may be a peripheral component interconnect (PCI) bus, an extended industry standard architecture (EISA) bus, or the like. The bus may be classified into an address bus, a data bus, a control bus, and the like.

Figure 12:
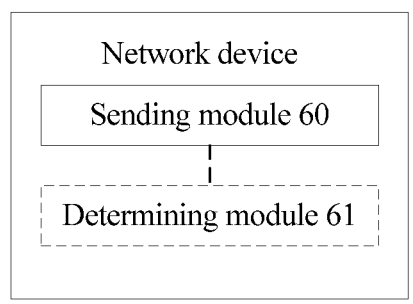
FIG. 12 is a schematic structural diagram 1 of a network device according to an embodiment of the present invention.

When each function module is obtained through division based on each corresponding function, FIG. 12 is a possible schematic structural diagram of the network device in the foregoing embodiments. As shown in FIG. 12, the network device may include a sending module 60 and a determining module 61. The sending module 60 may be configured to support the network device in performing S101, S103, S108, and S201 in the method embodiments. The determining module 61 may be configured to support the network device in performing S103a and S108a in the method embodiments. All related content of steps in the foregoing method embodiments may be cited in function descriptions of corresponding function modules. Details are not described herein again.

Figure 13:
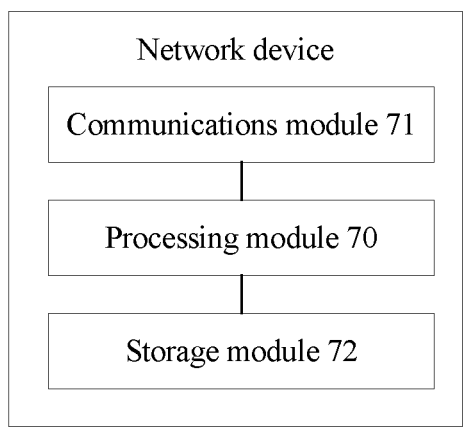
FIG. 13 is a schematic structural diagram 2 of a network device according to an embodiment of the present invention.

When an integrated unit is used, FIG. 13 is a possible schematic structural diagram of the network device in the foregoing embodiments. As shown in FIG. 13, the network device may include a processing module 70 and a communications module 71. The processing module 70 may be configured to control and manage an action of the network device. For example, the processing module 70 is configured to support the network device in performing S103a and S108a in the method embodiments, and/or is configured for another process of the technology described in this specification. The communications module 71 may be configured to support communication between the terminal and another network entity, for example, the communications module 71 may be configured to support the network device in performing S101, S103, S108, and S201 in the method embodiments. Optionally, as shown in FIG. 13, the network device may further include a storage module 72, configured to store program code and data of the network device.

The processing module 70 may be a processor or a controller (for example, may be the BBU 20 shown in FIG. 2), for example, may be a CPU, a general purpose processor, a DSP, an ASIC, an FPGA or another programmable logic device, a transistor logic device, a hardware component, or any combination thereof. The processing module 70 may implement or execute various example logical blocks, modules, and circuits described with reference to content disclosed in the embodiments of the present invention. Alternatively, the processor may be a combination of processors implementing a computing function, for example, a combination that includes one or more microprocessors, or a combination of a DSP and a microprocessor. The communications module 71 may be a transceiver, a transceiver circuit, a communications interface, or the like (for example, may be the RRU 21 shown in FIG. 2). The storage module 72 may be a memory.

When the processing module 70 is a processor, the communications module 71 is a transceiver, and the storage module 72 is a memory, the processor, the transceiver, and the memory may be connected via a bus. The bus may be a PCI bus, an EISA bus, or the like. The bus may be classified into an address bus, a data bus, a control bus, and the like.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, all or a part of the procedures or functions according to the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

With descriptions of the foregoing implementations, a person skilled in the art may clearly understand that, for the purpose of convenient and brief description, division of the foregoing function modules is taken as an example for illustration. In actual application, the foregoing functions can be allocated to different function modules for implementation based on a requirement. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the current system, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
receiving, by a terminal, transmission resource pool configuration information from a network device, wherein the transmission resource pool configuration information comprises a transmission resource pool identifier and transmission resource pool resource configuration information;
independently and distinctly receiving, by the terminal, state indication information from the network device;
independently selecting, by the terminal, a direct link transmission resource from time-frequency transmission resources corresponding to the transmission resource pool resource configuration information when the terminal determines based on the state indication information received from the network device that a transmission resource pool is in a first state, the first state being a distributed transmission mode, and sending, by the terminal, direct link service data using the direct link transmission resource; and stopping, by the terminal, independently selecting time-frequency transmission resources from the time-frequency transmission resources corresponding to the transmission resource pool resource configuration information when the terminal determines based on the state indication information that the transmission resource pool is in a second state, the second state being a centralized transmission mode.

2. The method according to claim 1, wherein the state indication information comprises first indication information, second indication information, or third indication information, wherein the first indication information comprises a further transmission resource pool identifier, wherein the second indication information comprises an indicator indicating a state of the transmission resource pool, and wherein the third indication information comprises a state activation instruction.

3. The method according to claim 2, wherein the terminal determines that the transmission resource pool is in the first state when the state indication information comprises the first indication information and when the further transmission resource pool identifier is a first transmission resource pool identifier, when the state indication information comprises the second indication information and when the indicator is a first indicator indicating that the transmission resource pool is in the first state, or when the state indication information comprises the third indication information and when the terminal receives the state activation instruction and the state activation instruction is a first activation instruction.

4. The method according to claim 1, wherein the transmission resource pool configuration information further comprises a first threshold, wherein the first threshold comprises a first load threshold, a first signal quality threshold, or a first priority threshold, wherein the terminal determines that the transmission resource pool is in the first state by:

determining, by the terminal according to a first preset condition, that the transmission resource pool is in the first state, wherein a second transmission resource pool is a transmission resource pool that is currently used by the terminal to send the direct link service data, and the first preset condition indicates that a load of the second transmission resource pool is greater than or equal to the first load threshold, that a signal quality of the network device is less than or equal to the first signal quality threshold, or that a priority of data to be transmitted by the terminal is higher than or equal to the first priority threshold.

5. The method according to claim 1, wherein the state indication information comprises fourth indication information, fifth indication information, or sixth indication information, wherein the fourth indication information comprises a further transmission resource pool identifier, wherein the fifth indication information comprises an indicator indicating a state of the transmission resource pool, and wherein the sixth indication information comprises a state activation instruction.

6. The method according to claim 5, wherein the terminal determines that the transmission resource pool is in the second state when the state indication information comprises the fourth indication information and when the further transmission resource pool identifier is a second transmission resource pool identifier, when the state indication information comprises the fifth indication information and when the indicator is a second indicator indicating that the transmission resource pool is in the second state, or when the state indication information comprises the sixth indication information and when the terminal receives the state activation instruction and the state activation instruction is a second activation instruction.

7. The method according to claim 1, wherein the transmission resource pool configuration information further comprises a second threshold, wherein the second threshold comprises a second load threshold, a second signal quality threshold, or a second priority threshold, wherein the terminal determines that the transmission resource pool is in the second state by:

determining, by the terminal according to a second preset condition, that the transmission resource pool is in the second state, wherein the second preset condition indicates that load of the transmission resource pool is less than the second load threshold, that a signal quality of the network device is greater than the second signal quality threshold, or that a priority of data to be transmitted by the terminal is lower than the second priority threshold.

8. The method according to claim 1, wherein the transmission resource pool configuration information further comprises a first area identifier, a first service type identifier, or a first bearer identifier, and wherein the method further comprises:

when a second area identifier corresponding to an area in which the terminal is located is the first area identifier, when a second service type identifier of data to be sent by the terminal is the first service type identifier, or when a second bearer identifier of data to be sent by the terminal is the first bearer identifier, independently selecting, by the terminal, the direct link transmission resource from the time-frequency transmission resources corresponding to the transmission resource pool resource configuration information, wherein the first area identifier indicates an available area of the transmission resource pool, the first service type identifier indicates a service type supported by the transmission resource pool for transmission, and the first bearer identifier indicates a bearer type supported by the transmission resource pool.

9. A method comprising:

sending, by a network device, a transmission resource pool configuration information to a terminal, wherein the transmission resource pool configuration information comprises a transmission resource pool identifier and transmission resource pool resource configuration information; and independently and distinctly sending, by the network device, state indication information to the terminal, wherein the state indication information comprises first indication information, second indication information, or third indication information, wherein the first indication information comprises a further transmission resource pool identifier for allowing the terminal to determine that a transmission resource pool is in a first state when the further transmission resource pool identifier is a first transmission resource pool identifier and for allowing the terminal to determine that the transmission resource pool is in a second state when the further transmission resource pool identifier is a second transmission resource pool identifier, wherein the second indication information comprises an indicator indicating a state of the transmission resource pool for allowing the terminal to determine that the transmission resource pool is in the first state when the indicator is a first indicator and for allowing the terminal to determine that the transmission resource pool is in the second state when the indicator is a second indicator, wherein the third indication information comprises a state activation instruction for allowing the terminal to determine that the transmission resource pool is in the first state when the state activation instruction is a first activation instruction and for allowing the terminal to determine that the transmission resource pool is in the second state when the state activation instruction is a second activation instruction, wherein the transmission resource pool corresponds to the transmission resource pool identifier, and wherein the first state is a distributed transmission mode and the second state is a centralized transmission mode.

10. The method according to claim 9, wherein the transmission resource pool configuration information further comprises a first threshold, and wherein the first threshold comprises a first load threshold, a first signal quality threshold, or a first priority threshold.

11. The method according to claim 9, wherein the transmission resource pool configuration information further comprises a second threshold, and wherein the second threshold comprises a second load threshold, a second signal quality threshold, or a second priority threshold.

12. The method according to claim 9, wherein the transmission resource pool configuration information further comprises a first area identifier, a first service type identifier, or a first bearer identifier, and wherein the first area identifier indicates an available area of the transmission resource pool, the first service type identifier indicates a service type supported by the transmission resource pool for transmission, and the first bearer identifier indicates a bearer type supported by the transmission resource pool.

13. A terminal comprising:
a processor; and
a non-transitory computer-readable storage medium storing a program to be executed by the processor, the program including instructions for:
receiving transmission resource pool configuration information from a network device, wherein the transmission resource pool configuration information comprises a transmission resource pool identifier and transmission resource pool resource configuration information;
independently and distinctly receiving state indication information from the network device;
independently selecting, a direct link transmission resource from time-frequency transmission resources corresponding to the transmission resource pool resource configuration information when the terminal determines based on state indication information received from the network device that a transmission resource pool is in a first state, the first state being a distributed transmission mode, and sending direct link service data using the direct link transmission resource; and
stopping independently selecting time-frequency transmission resources from the time-frequency transmission resources corresponding to the transmission resource pool resource configuration information when the terminal determines based on the state indication information that the transmission resource pool is in a second state, the second state being a centralized transmission mode.

14. The terminal according to claim 13,
wherein the state indication information comprises first indication information, second indication information, or third indication information,
wherein the first indication information comprises a further transmission resource pool identifier,
wherein the second indication information comprises an indicator indicating a state of the transmission resource pool, and
wherein the third indication information comprises a state activation instruction.

15. The terminal according to claim 14,
wherein the terminal determines that the transmission resource pool is in the first state when the state indication information comprises the first indication information and when the further transmission resource pool identifier is a first transmission resource pool identifier,
when the state indication information comprises the second indication information and when the indicator is a first indicator indicating that the transmission resource pool is in the first state, or
when the state indication information comprises the third indication information and when the terminal receives the state activation instruction and the state activation instruction is a first activation instruction.

16. The terminal according to claim 13,
wherein the transmission resource pool configuration information further comprises a first threshold,
wherein the first threshold comprises a first load threshold, a first signal quality threshold, or a first priority threshold, and
wherein the instructions comprise further instructions for:
determining, according to a first preset condition, that the transmission resource pool is in the first state,
wherein a second transmission resource pool is a transmission resource pool that is currently used by the terminal to send the direct link service data, and the first preset condition indicates that a load of the second transmission resource pool is greater than or equal to the first load threshold, that a signal quality of the network device is less than or equal to the first signal quality threshold, or that a priority of data to be transmitted by the terminal is higher than or equal to the first priority threshold.

17. The terminal according to claim 13, wherein further comprising instructions for:
receiving, by the terminal, second state indication information from the network device,
wherein the second state indication information comprises fourth indication information, fifth indication information, or sixth indication information,
wherein the fourth indication information comprises a further transmission resource pool identifier, wherein the fifth indication information comprises an indicator indicating a state of the transmission resource pool, and wherein the sixth indication information comprises a state activation instruction.

\* \* \* \* \*